United States Patent [19]

Sahay et al.

[11] 4,442,972

[45] Apr. 17, 1984

[54] ELECTRICALLY CONTROLLED PROGRAMMABLE DIGITAL THERMOSTAT AND METHOD FOR REGULATING THE OPERATION OF MULTISTAGE HEATING AND COOLING SYSTEMS

[75] Inventors: Bharat B. Sahay, Johnson City; James J. Jones, Elizabethton, both of Tenn.

[73] Assignee: Texas Instruments Incorporated, Dallas, Tex.

[21] Appl. No.: 301,783

[22] Filed: Sep. 14, 1981

[51] Int. Cl.³ .............................................. F23N 5/20
[52] U.S. Cl. .................................. 236/1 EA; 165/12; 236/46 R
[58] Field of Search ................. 165/12, 29; 236/46 R, 236/1 R, 1 EA, 1 ER; 62/231

[56] References Cited

U.S. PATENT DOCUMENTS

| | | | |
|---|---|---|---|
| 4,172,555 | 10/1979 | Levine | 236/46 R |
| 4,265,298 | 5/1981 | Sumner et al. | 165/12 X |
| 4,265,299 | 5/1981 | Harnish | 165/12 |
| 4,266,599 | 5/1981 | Saunders et al. | 165/12 X |
| 4,269,261 | 5/1981 | Kountz et al. | 165/12 X |

Primary Examiner—William E. Wayner
Attorney, Agent, or Firm—John A. Haug; James P. McAndrews; Melvin Sharp

[57] ABSTRACT

An electronically controlled programmable wall thermostat provides better control of comfort temperature and permits improved energy-saving temperature setback at selected intervals of the day or night in multistage heating and cooling systems and is particularly useful in achieving improved energy savings for systems having heat pump means in the main temperature conditioning stage of the system. The thermostat includes clock means, temperature sensing means, means for displaying desired parameters of time and temperature, data entry and storage means for programming the thermostat to maintain desired temperatures during selected time intervals, and a processing means with a memory incorporating a permanently stored program instruction sequence which responds to signals from the temperature sensing means for controlling the heating and cooling systems in accordance with the time-temperature sequence programmed into the thermostat by the user. A novel method of temperature control is described in which the temperature sensing and processing means cooperate in a unique way to regulate operation of the main or heat pump stages of the heating and cooling systems relative to a programmed set temperature and to regulate operation of the auxiliary stages of the systems only with respect to the actual rate of change of temperature being effected by any operation of the system. In that way, the thermostat provides improved control of the comfort temperature under varying weather conditions and in different types of housing conditions and achieves timely and more energy-efficient recovery from setback temperatures at an optimum temperature restoring rate to result in more selective use of the heat pump means in the main stages of the systems.

8 Claims, 10 Drawing Figures

ELECTRICALLY CONTROLLED PROGRAMMABLE DIGITAL THERMOSTAT AND METHOD FOR REGULATING THE OPERATION OF MULTISTAGE HEATING AND COOLING SYSTEMS

BACKGROUND OF THE INVENTION

The field of this invention is that of electronic thermostats for multistage heating or cooling systems and the invention relates more particularly to programmable thermostats for multistage heating and cooling systems which use heat pumps in the main stages of the systems and to methods for regulating operation of such multistage systems.

Electronic programmable digital thermostats are being used extensively and with great success to achieve substantial energy savings by providing automatic shutdown or temperature setback of conventional temperature conditioning systems during sleeping hours or when a living space is unoccupied. Many of such systems use multiple heating or cooling stages to obtain greater operating efficiencies. Some systems incorporate heat pumps to achieve other energy savings by taking advantage of the greater energy efficiency of heat pumps relative to conventional furnaces. Heat pump systems are usually of the multistage type in that they have less efficient auxiliary stages such as electrical resistance heaters which supplement the heating capacity of the heat pump means during colder weather. Frequently however, multistage systems present some comfort temperature control problems, and multistage systems using heat pump means or the like in the main system stages often fail to achieve satisfactory economies when used in temperature setback operation.

For example, under some climatic conditions, the temperature provided by a typical multistage temperature conditioning system using a conventional thermostat is permitted to fluctuate around a temperature which is offset by as much as 2° F. From the intended control temperature set by the user. That occurs because, in such conventional thermostats, the temperature set by the user serves as the threshold temperature of the main heating or cooling stage of the system while the threshold temperatures of the other, auxiliary heating or cooling stages vary by up to about 2° F. from the main stage threshold temperature. The auxiliary thresholds are selected and arranged so that, under most normal weather or housing conditions, the comfort temperature is regulated around the control temperature the user has selected. However, when climatic conditions are relatively severe so that the main heating or cooling stage of the system does not in itself have sufficient capacity to bring room temperature to the control temperature set by the user, the threshold temperature of a second or subsequent stage of the system can become the effective control temperature of the system. In that situation, the temperature provided by the system fluctuates around that alternate "control" temperature which is offset by as much as 2° F. from the desired control temperature, thereby resulting in considerable user discomfort.

Similarly, when a temperature set back has been provided during the night, the amount of heating or cooling and the period of system operation required for recovery from the setback temperature in the morning can vary widely with changes in climatic conditions. This is particularly true where the thermal characteristics of the building are relatively poor or where the heating or cooling capacity of the system is relatively limited with respect to the size of the comfort controlled zone. As a result, where conventional thermostats control operation of the various stages of the system by reference to independent threshold temperatures for the various system stages, they frequently do not restore the desired comfort temperature at the scheduled time and either cause discomfort by tardy temperature restoration or lose potential energy savings by premature temperature restoration.

The conventional thermostats also tend to lose potential energy savings in setback operation of multistage temperature conditioning systems by the excessive or unnecessary use of the usually less efficient auxiliary stages of the system. This is particularly true in the case of heat pump systems in which very high efficiency heat pumps in the main temperature conditioning system stages are typically combined with substantially less efficient electrical resistance heaters in the auxiliary heating stages. For example, when a conventional programmable thermostat is used with a multistage heat pump system, the recovery from a setback temperature is often scheduled to occur in the morning at the coldest part of the day when a heat pump tends to operate at its lowest level of efficiency. In that circumstance, some conventional thermostats call for immediate use of both the heat pump and the auxiliary heating means to provide quick recovery of the comfort temperature after reaching the scheduled end of the night time temperature setback period. That is, because there is a substantial difference between the setback temperature and the desired comfort temperature to be restored at the end of the setback period, both main and auxiliary heaters are used in restoring the comfort temperature and a large part of the temperature restoration tends to be effected by the less efficient auxiliary heating means. Such use of the less efficient auxiliary heating stages can result in loss of some or all of the energy savings which had been accumulated during the overnight setback period even though longer use of the more efficient heat pump means alone might have resulted in suitably prompt comfort temperature restoration in the morning in a more energy-efficient manner. Other known thermostats attempt to regulate operation of the various heating or cooling stages of multistage systems by reference to estimated heating capacities of the system components. One known system initiates system operation after temperature setback a set time before the end of the setback period whether there is a large or small difference between the setback and desired recovery temperature.

With the present emphasis on energy conservation, it is desirable to provide improved thermostats and control methods for use with a multistage heating and cooling system to obtain improved control of comfort temperatures while taking advantage of the potential energy savings resulting from the use of heat pump means and from the temperature setback type of system operation.

SUMMARY OF THE INVENTION

It is therefore an object of this invention to provide a novel and improved thermostat for regulating operation of a heating or cooling system; to provide such a thermostat which is particularly adopted for regulating operation of multistage temperature conditioning systems; to provide such a thermostat which is particularly adopted for regulating operation of heating or cooling systems incorporating heat pump means; to provide such a thermostat which is particularly adopted for use in energy-saving seetback temperature type of operation; to provide a novel and improved thermostat which provides improved temperature control and more energy efficient operation for a multistage temperature conditioning system using heat pump means where the system is adopted for the temperature setback type of operation; to provide novel and improved methods for regulating operation of multistage temperature conditioning systems; and to provide novel and improved temperature conditioning systems incorporating improved and advantageous thermostat means for controlling the systems in a more energy efficient manner.

Briefly described, the novel and improved thermostat of this invention comprises an electronic programmable wall thermostat and preferably comprises a digital thermostat similar to that described in U.S. patent application Ser. No. 970,019, filed Dec. 18, 1978, entitled "Electronically Controlled Programmable Digital Thermostat" and in U.S. patent application Ser. No. 183,703 filed Aug. 26, 1980, entitled "Electronically Controlled Programmable Digital Thermostat Having Variable Threshold Hysteresis With Time", which applications are copending with, and commonly assigned to the assignee of, the present application. The thermostat is adopted to be electrically coupled to an AC power supply and to the fan and multiple heating and cooling stages of a multistage temperature conditioning system, preferably one which incorporates heat pump means in a main stage of the system. The thermostat is adopted to control the system using a novel method to provide desired comfort temperature or energy-saving setback temperatures in a living space or the like during respective intervals of the day or night in an improved manner.

In a preferred embodiment of the invention, the thermostat comprises a programmable digital processor having a read only memory (ROM) containing a permanently stored, fixed instruction set and having a random access memory (RAM) which stores coded instructions entered into the processor by the user. The user instructions program the system to provide selected temperatures in a temperature conditioned zone during respective periods of the day and night in a selected time sequence. The thermostat includes a plurality of mode switches for selecting a desired type of system operation; keyboard data entry means for entering coded user instructions; temperature sensing means to provide an analog temperature-indicating signal corresponding to an ambient temperature sensed in a heated or cooled space or zone; and an analog-to-digital converter which transforms the analog temperature-indicating signal to produce a corresponding digital signal and to provide that digital signal to the digital processor. The processor responds to the digital signal and to the coded instructions stored in the RAM to selectively gate controllable switch means such as triac means to activate and/or deactivate the fan and the heating and cooling stages of the system in dependence upon the state of the plurality of mode switches, thereby to control the temperature of the living space or zone as dictated by the instruction set permanently stored in the ROM and by the user instructions entered into the RAM. The thermostat is programmable to automatically maintain desired ambient temperatures in the zone during selected time periods and is programmable for automatic shutdown or temperature setback during periods when the heated or cooled space is unoccupied or when activity in the space is reduced during sleeping hours. The thermostat is also operable in a manual mode to continuously maintain a setback or comfort temperature if desired. The thermostat includes a 60 Hz. oscillator for timekeeping functions, has a display for desired parameters of time and temperature, and has characters for indicating operating modes and days of the week and the like.

In the preferred embodiment of this invention, the instruction set stored in the ROM as fixed, permanently stored firmware provides a routine which periodically compares the ambient temperature sensed by the thermostat with the control temperature the thermostat is programmed to maintain. In accordance with the method of this invention, the routine actuates the main heating or cooling stages of the system when there is a selected difference between those temperatures. Preferably, that routine incorporates hysteresis which is variable with time in regulating main stage operation to avoid unnecessary system cycling as has been previously described in the latter of the two patent applications noted above. In accordance with this invention, the routine also repeatedly updates the signal provided by the temperature sensing means; utilizes that signal to periodically determine the rate of change of the sensed ambient temperature being effected in the temperature conditioned zone by any operation of the main temperature conditioning means or the like; and operates the auxiliary heating or cooling stages of the system by reference to that detected rate of ambient temperature change so that the auxiliary stages operate only when they are actually shown to be necessary to supplement the main system stages for restoring set temperatures at a temperature which is selected as an optimum or desired temperature restoring rate. That is, the auxiliary stages are actuated only when the main stage is operating and only when the actual rate of temperature change being effected by the main stage is less than a selected or desired rate of change of zone temperature. Any such operation of the auxiliary stage is terminated if the rate of change of zone temperature becomes greater than the desired optimum temperature restoring rate and any operation of both of the main and auxiliary temperature conditioning stages is terminated when zone temperature is restored to main stage threshold temperature as set by the user. In that way, the thermostat controls temperature to consistently maintain the control temperature set by the user even during sharp or severe changes in climatic conditions; the period of recovery for a setback temperature is proportioned to permit maximum use of the more energy efficient main stage temperature conditioning means; improved energy savings are achieved by operating the less efficient auxiliary temperature conditioning means of the system only when there is a positive showing that they are actually required to supplement the rate of heating being provided by the more energy-efficient main system stages; and the desired set temperatures are promptly but not prematurely restored as necessary even where the thermal characteristics of the building or the heating or cooling capacities of the system may tend to require substantially different degrees of heating or cooling under different climatic conditions.

In one preferred embodiment of the invention, the routine provided as fixed, permanently stored firmware in the ROM periodically determines the difference between the temperature in the living space during a setback period and the temperature to be provided in that zone at the end of the setback period. That temperature difference is then utilized in determining the start up time for the main stage which would be necessary for restoring the desired comfort temperature at the end of a setback period. That is, the routine continuously determines the difference between the actual zone temperature during the setback period and the next scheduled zone temperature; determines the time prior to the start of the next scheduled time period when any operation of the main temperature conditioning means is required to be initiated for restoring the desired comfort temperature at the end of the setback period assuming a selected optimum rate of change in zone temperature during operation of the main temperature conditioning means; and initiates operation of the main system stage at said determined restart time to initiate restoration of the desired comfort temperature. Operation of the auxiliary temperature conditioning stages of the system are then regulated by reference to the actual rate of change of zone temperature effected by the main temperature conditioning means as above described, thereby to aid the main conditioning means as may be required in restoring the desired comfort temperature at the desired rate. In that way, further improved temperature control and further improved energy efficiencies are obtained particularly where the high efficiency heat pump type of heating or cooling means are incorporated in the main stages of the heating or cooling system.

In the preferred embodiment of this invention, the processor means comprises a single-chip digital processor of the type conventionally used for calculator type applications having an internal ROM permanently dedicated to storage of the above-noted instruction set. However, it will be understood that various components of the thermostats are also adopted to be implemented with independent discrete logic circuitry and the like in any conventional manner within the scope of this invention.

DESCRIPTION OF THE DRAWINGS

Other objects, advantages and details of the novel method, of the novel and improved electronic programmable digital thermostat, and of the novel and improved temperature conditioning system of this invention appear in the following detailed description of preferred embodiments of the invention, the detailed description referring to the drawings in which.

DESCRIPTION OF THE PREFERRED EMBODIMENTS

Figure 1:
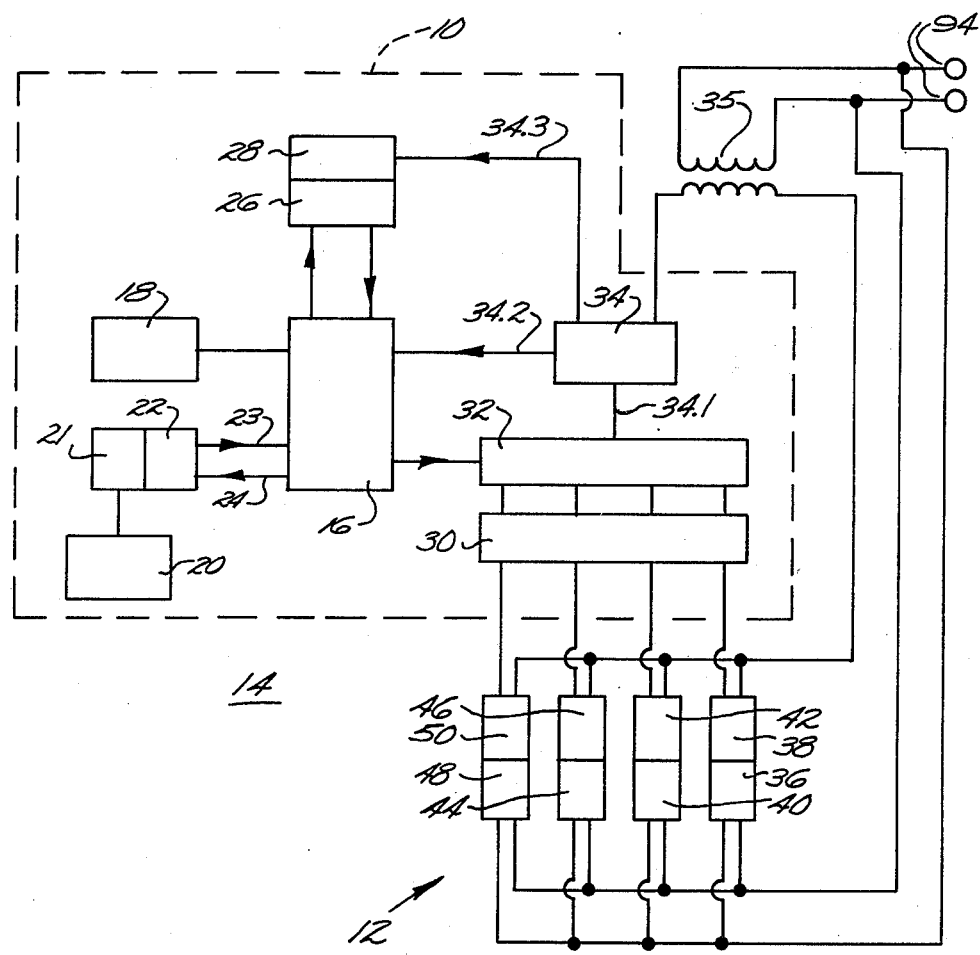
FIG. 1 is a block diagram of the thermostat of this invention incorporated in the temperature conditioning system of this invention.

Referring to the drawings, 10 in FIG. 1 indicates the novel and improved electronically controlled programmable digital thermostat of this invention which is shown to be used in a temperature conditioning system 12 to control the temperature in a living space or zone 14. The thermostat includes a digital processor means 16, clock means 18, temperature sensing means 20 for sensing the temperature in the zone 14, scaling amplifier means 21, analog-to-digital converter means 22 responsive to an amplified signal from the temperature sensing means 20 for providing a digital signal 23 to the processor 16 corresponding to the temperature in the zone 14 when interrogated by the processor as indicated at 24 in FIG. 1, data entry means 26 for programming the thermostat 10 to maintain selected temperatures in the zone during selected periods of time in a selected time sequence, means 28 for displaying desired parameters of time and temperature programmed into the thermostat, a plurality of manually operable mode switches indicated diagrammatically at 30 in FIG. 1, and switch or relay driver means 32 such as triac means or the like. As indicated diagrammatically in FIG. 1, the thermostat 10 has a power supply 34 connected to a power source 35 for the temperature conditioning system 12 and is preferably arranged to selectively operate a main heating or temperature conditioning means such as heat pump 36 through a relay 38 and to operate an auxiliary heating or temperature conditioning means such as an electrical resistance heater 40 through a relay 42. Preferably, the relay driver means are also connected to fan means 44 through a relay 46 and, where the temperature conditioning system 12 is also adopted to provide cooling, the driver means 32 are connected to cooling means 48 through a relay 50. Preferably, for example, where the temperature conditioning system utilizes conventional reversible heat pump means to serve both main stage heating and cooling functions, the relay 50 is arranged to operate the reversing valve of the heat pump which is used in converting the heat pump from heating to cooling functions in conventional manner as will be understood.

Figure 2:
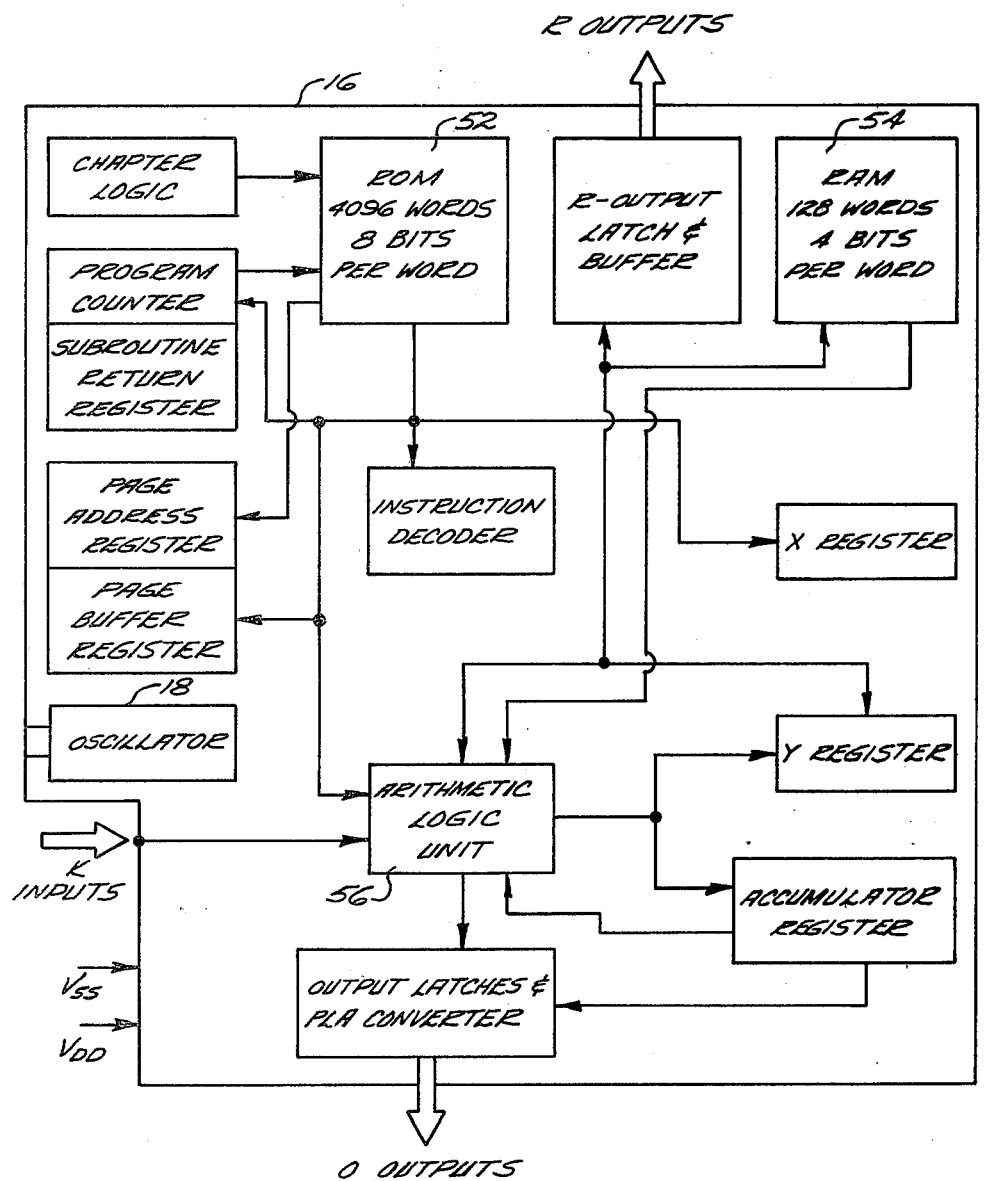
FIG. 2 is a block diagram of digital processor means used in the thermostat of FIG. 1.

In the preferred embodiment of this invention, the digital processor means 16 preferably comprises a microprocessor such as that shown in U.S. Pat. No. 3,991,305 the disclosure of which is hereby incorporated herein by this reference. Preferably for example, the processor 16 comprises a single chip semiconductor digital processor corresponding to the processor made and sold by Texas Instruments Incorporated as a standard product under the designation TMS1670 for general availability to the industry. As is diagrammatically illustrated in FIG. 2, that processor includes a ROM 52 which in accordance with this invention is adopted to permanently store a full instruction set of digital coded instructions as hereinafter described for controlling operation of the thermostat 10 in a novel and advantageous manner; includes a RAM 54 for storing digital coded information (such as that entered into the processor by the thermostat user to designate desired time-temperature parameters) while such information is being processed in the thermostat; and includes an arithmetic logic unit 56 for performing arithmetic and logic operations as hereinafter described.

The clock means 18 comprises any conventional 60 Hz. oscillator means or the like adopted to supply a continuous series of timing pulses to the processor 16 and, in the preferred embodiment, is preferably incorporated in an interface device such as that sold by Texas Instruments Incorporated under the designation SN7205.

In the preferred embodiment of this invention, the temperature sensing means 20 preferably comprises a sensistor having an electrical resistance which varies substantially linearly with temperature over the selected range of temperatures likely to be encountered in the living space or temperature conditioning zone 14. Preferably for example, the temperature sensing means comprises a sensistor of the spreading resistance type such as that manufactured and sold by Texas Instruments Incorporated under the designation TSP102 which is adopted to provide an electrical output varying substantially linearly with temperature from about 32° F. to 122° F.

In the preferred embodiment of this invention, a scaling amplifier or the like 21 of conventional type applies the sensor output in appropriately amplified form to the analog-to-digital converter 22 which is arranged in any conventional manner to be responsive to the electrical output provided by the temperature sensing means 20 during temperature variations in the zone 14 to provide digital coded information at 23 to the processor 16 corresponding to the temperature sensed in the zone 14 as the sensor is repeatedly interrogated by the processor through the converter. Preferably for example, the A/D converter 22 comprises the low cost, high reliability unit made and sold by Texas Instruments Incorporated under the designation SN78565 which is generally available to the industry and the scaling amplifier 21 is incorporated in the interface device SN7205 previously noted above.

Figure 3:
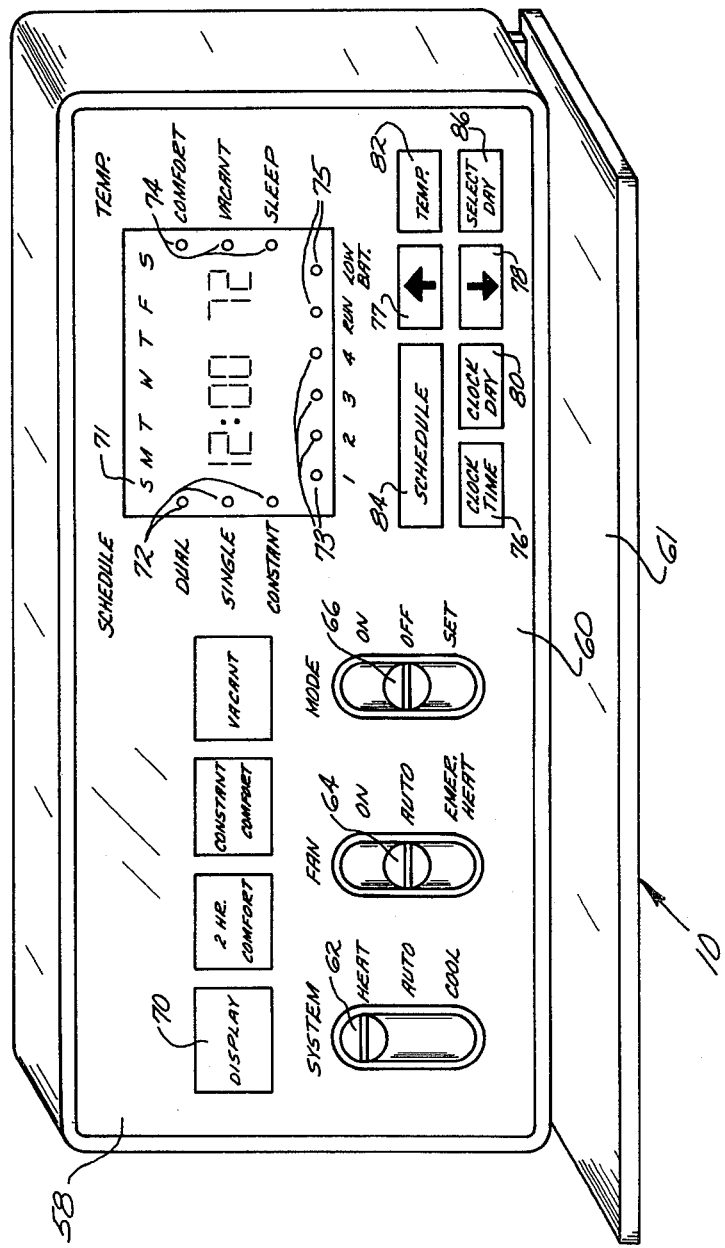
FIG. 3 is a perspective view of the thermostat of this invention.

In the preferred embodiment of this invention, the thermostat 10 is incorporated in a housing 58 and the data entry means 26 and display means 28 as well as the plurality of mode switches 30 are provided on a control panel 60 of the housing as is illustrated particularly in FIG. 3. If desired, a cover 61 is hinged to the housing 58 to permit covering of the panel when not in use.

Preferably for example, the mode switches indicated generally at 30 in FIG. 1 include three manually operable switches 62, 64 and 66 each having three operational positions as is illustrated in FIG. 3. The first manually operable switch 62 is moveable from HEAT position, where it limits the operation of the temperature conditioning system 12 to a heating function only; to COOL, where it limits operation of the system to a cooling function only; or to AUTO, where it permits the system to provide either heating or cooling as may be required. The second manually operable switch 64 is moveable between a first ON position where it regulates the system fan 44 to operate independently of the remainder of the system 12; and an AUTO position, where the fan 44 is operated only when the heating means 36 or 40 or the cooling means 50 of the system are operating as is hereinafter described; or EMER HEAT position where the fan is operated only with the heating means 40 to override control of the thermostat 10 where special circumstances may require. The third manually operable switch 64 is moveable from an OFF position wherein operation of the system 12 is not enabled; to an ON position wherein the system 12 is operated under regulation by the thermostat 10; and to a SET position wherein entry of data into the thermostat 10 by use of the data entry means 26 and display means 28 is permitted. The mode switches preferably comprise 1-3 pole multiple throw slide switches of any conventional type.

In a preferred embodiment of this invention, the display means 28 comprise a four digit vacuum fluorescent (VF) display 68 for time-of-day parameters and a two digit VF display 69 for temperature parameters. Those displays are preferably arranged either to operate continuously together; to display only the time of day continuously; to display only the existing temperature continuously; or to be blank as the DISPLAY key 70 is manually activated by pressing four times to move the display through said four display statuses in sequence. In the preferred embodiment, the display means 28 also include similar displays 71 for days of the week, include indicator lights 72 for DUAL, SINGLE and CONSTANT types of operating schedules as described below, include indicator lights 73 for stages 1-4 in those operating schedules as described below, include indicator lights 74 for COMFORT, VACANT and SLEEP temperatures to be provided in those scheduled stages as described below, and preferably include other indicator lights 75 to indicate when the heating or cooling means 36 or 40 is running and when a back up battery used in the thermostat requires replacement.

In the preferred embodiment of the invention, the data entry means 26 includes a plurality of switches 76, 77, 78, 80, 82, 84 and 86 which cooperate with the display means 28 and with the mode switches 30 for programming the thermostat 10. In that regard, the thermostat is preferably adopted to provide three different temperatures (COMFORT, VACANT or SLEEP) in each of the two operating modes (Heating and Cooling) of the system 12 and to provide three alternate time-temperature sequences comprising a DUAL temperature setback schedule wherein zone temperature is changed from SLEEP to COMFORT, to VACANT, to COMFORT and back to SLEEP during respective sequential periods of the day, a SINGLE temperature setback schedule wherein zone temperature is changed from SLEEP to COMFORT and back to SLEEP during respective sequential periods of the day, and a CONSTANT temperature schedule wherein the same COMFORT temperature is maintained throughout the day. The thermostat is preferably adopted to provide such schedules in any selected sequence for seven days and to continuously repeat that selected seven day sequence until one or more of the time or temperature settings is changed by the user or until such scheduled operation of the system is overriden by operation of the mode switches 30 or by one of the specific overriding switches 88, 90 or 92.

In its preferred embodiment, the thermostat is programmed or reprogrammed for control of heating by positioning the mannually operable switch 62 at HEAT and by positioning the manual switch 66 at SET to enable the data entry means 26 for entering selected time and temperature parameters for the heating mode of the system in the form of digital coded information into the RAM 54 in the processor 16.

Pressing of the CLOCK TIME key 76 then permits the time display 68 to be changed to the actual time of day by pressing either one of the slew switches 77 or 78. Each pressing of the CLOCK DAY key 80 then changes the day of the week display 71 by one day to permit the actual day of the week to be set on the display at 71 for correlating the thermostat with real time.

Pressing of the TEMP key 82 then activates one of the indicator lights 74 at COMFORT for example and pressing of one of the slew keys 77 or 78 changes the temperature display 69 to a desired COMFORT temperature such as 72° F. Pressing of the CLOCK TIME key 76 then completes that programming step and sets the thermostat to provide a temperature of 72° F. whenever a COMFORT temperature is scheduled. Subsequent pressings of the TEMP key 82 move the indicator light 74 from COMFORT to VACANT to SLEEP and back to COMFORT in sequence permitting a VACANT temperature such as 55° F. and a SLEEP temperature such as 62° F. to be programmed into the thermostat in similar manner for regulating operation of the system 12 in the heating mode.

Figure 4:
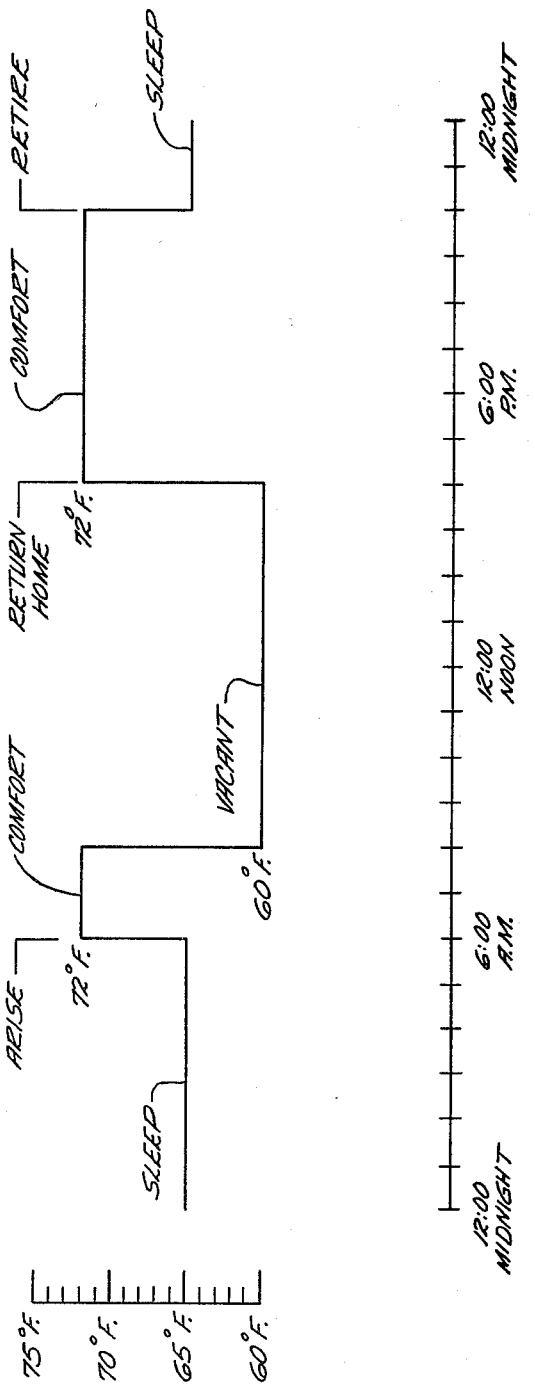
FIG. 4 is a graph illustrating a desired time-temperature sequence programmed into the thermostat by a user.

Pressing of the SCHEDULE key 84 then activates an indicator light 72 and an indicator light 73, at DUAL and at "1" respectively for example, and pressing of one of the slew keys 77 or 78 changes the time display 68 to display a desired time such as 7:00 A.M. as the time when the user intends to rise from bed in the morning for example. Pressing of the TEMP key 82 as necessary to light the indicator light 74 at COMFORT and pressing of the CLOCK TIME key 76 then completes that programming step and sets the thermostat to provide the COMFORT temperature of 72° F. at 7:00 A.M. during the "1" schedule period when the system is operated on the DUAL temperature setback schedule described above. Subsequent pressings of the SCHEDULE key 84 moves the indicator lights 72 and 73 from DUAL and "1" to DUAL and "2", to DUAL and "3" etc. to pass through the four periods of the DUAL schedule to the two periods of the SINGLE setback schedule and to the CONSTANT temperature schedule and permits "go to work" times and temperatures, "come back from work" times and temperatures, "bedtime" times and temperatures to be programmed into the thermostat for both DUAL and SINGLE schedules. A typical schedule for DUAL temperature setback operation is illustrated in FIG. 4 and shows that the thermostat is adopted to setback the temperature in zone 14 to the SLEEP temperature of 62° F. during the nightime, to recover to the COMFORT temperature of 72° F. at 7:00 A.M. when a user prepares for work, sets back the zone temperature to the VACANT temperature of 55° F. while the user is absent from his home during the workday, restores the COMFORT temperature at 5:00 P.M. at the end of the workday, and then again sets back the zone temperature to SLEEP temperature at 11:00 P.M.

In the preferred embodiment of this invention, the thermostat 10 is programmed to provide any of the desired temperature setback schedules on any of seven days in sequence and to continuously repeat that seven day sequence. That is, each presssing of the SELECT DAY key 86 changes the day of the week display 71 by one day for setting the display at a selected day. Pressing the SCHEDULE key 84 the required number of times to designate the DUAL temperature schedule, for example, followed by pressing of the CLOCK TIME key 76 completes that programming step and sets the thermostat to provide the DUAL schedule on the selected day. Subsequent pressing of the SELECT DAY key permits other schedules to be set for the respective days of the week in a similar manner. Typically, for example, the thermostat is programmed to provide the DUAL schedule on work days and the SINGLE schedule on weekend days although any desired combinations may be set. As will be understood, the thermostat is also adopted to be programmed in the same way while the manual switch 62 is set at COOL to additionally program the thermostat to provide corresponding COMFORT, VACANT and SLEEP temperatures in similar setback schedules for cooling operation of the system 12 for the seven days of the week. After completing the progamming, movement of the mode switch 66 to ON position then initiates operation of the thermostat to regulate the system 12 for heating or cooling as determined by the setting of the mode switch 62.

In a preferred embodiment of the invention, the 2HR CONSTANT overriding switch means 88 is adopted to be pressed for providing the selected COMFORT temperature for a two hour period following pressing of the key regardless of the temperature scheduled to be provided by the thermostat during that period. Similarly, the thermostat is preferably provided with another CONSTANT switch means 90 which is pressed to override the programmed time-temperature sequence of the thermostat to provide the COMFORT temperature continuously until the key is repressed to permit the thermostat 10 to resume its scheduled time-temperature sequence. Similarly, the thermostat is also preferably provided with VACANT overriding switch means 92 which, when pressed, overrides the program time-temperature sequence to provide the selected, VACANT low temperature during a period when the living space or zone 14 is to be vacant. Repressing of the switch 92 permits the thermostat to resume its scheduled time-temperature sequence control of the system 12. The thermostat permits resumption of the desired time-temperature sequence in correct correlation to the actual time of day after the end of the overriding control of the system 12 by the switches 88, 90 and 92 as will be understood.

In the preferred embodiment of this invention, the power supply 34 is adopted to be connected to a step down transformer 35 which is connected to a conventional 115 VAC line indicated at 94 for providing 24 VAC to the power supply 34 and to the relays 38, 42, 46 and 50 for operating the thermostat 10 and components of the system 12. Preferably for example, the power supply 34 is adopted to supply 24 VAC to the mode switches 30 and drive means 32 as indicated at 34.1 in FIG. 1, to supply +9 VDC to operate the processor 16 as indicated at 34.2, and to supply −16 VDC to operate the display means 28 as indicated at 34.3. The power supply is preferably incorporated in the interface device SN75205 previously noted.

In the preferred embodiment of this invention, the driver means 32 comprises any conventional triac for other switch means adopted to be selectively operated by the processor 16, such means typically comprising triac means sold under the designation TIC216A by Texas Instruments Incorporated which are connected in conventional manner to driver means incorporated in the interface device SN75205 noted above.

Figure 5:
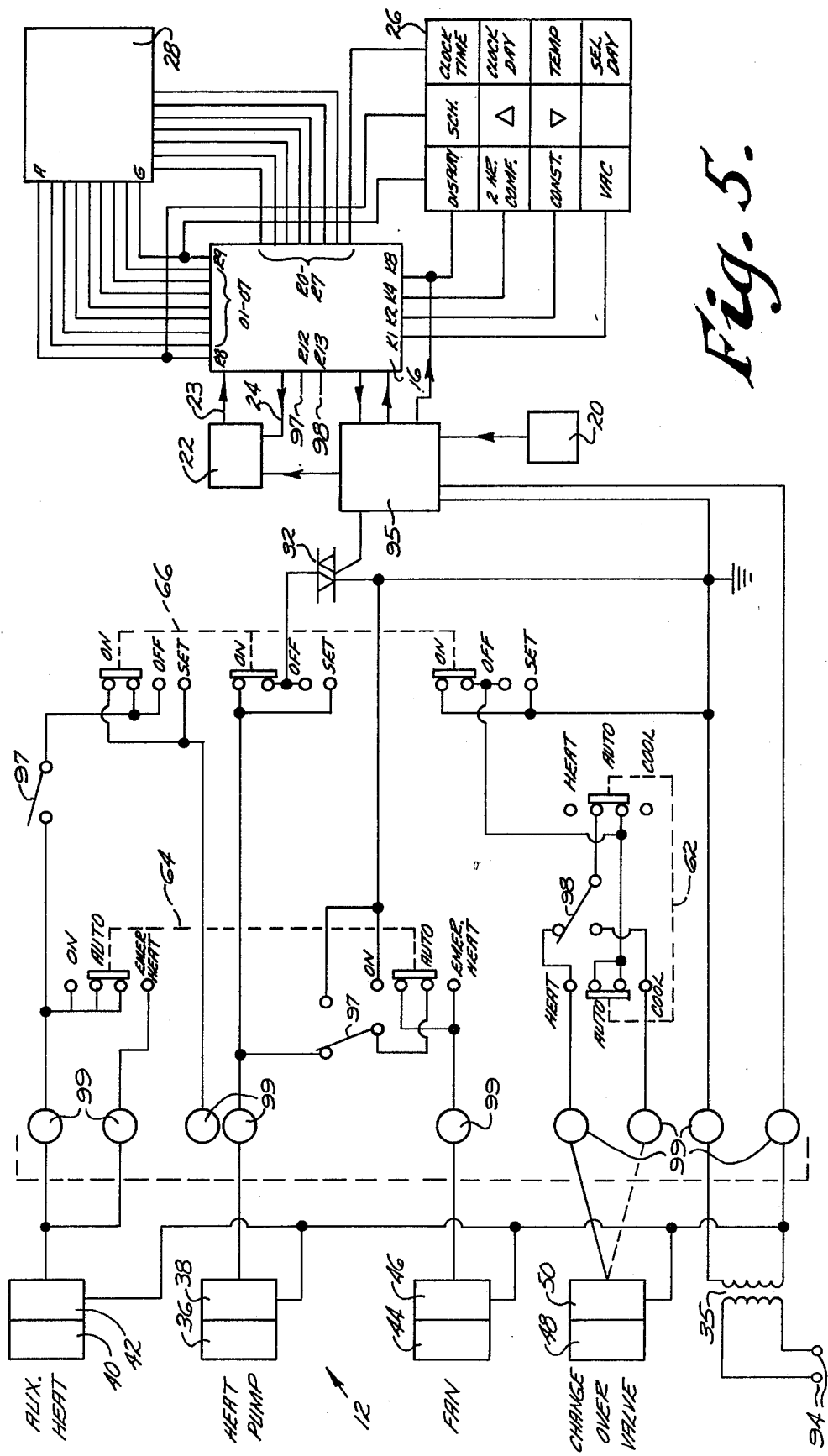
FIG. 5 is a circuit diagram illustrating electrical connection of the electronic components of the thermostat of this invention in the temperature conditioning system of this invention.

Interconnection of the noted sensor, A/D converter, keyboard, display, interface device, mode switches and processor means and the like as described above is effected in conventional manner to form the thermostat 10 and the system 12 in accordance with this invention as is diagrammatically illustrated in FIG. 5. In that regard, the digital processor 16 controls the operation of the system 12 by receiving input signals via input terminals $K_1$ $K_2$ $K_4$ and $K_8$ and by transmitting output signals via output terminals $R_0$–$R_{15}$ and $0_0$–$0_7$. The processor has a 60 Hz. clocking signal applied to the processor input terminal $K_9$ from the oscillator 18 incorporated in the interface divice SN75205 noted above which is referenced at 95 in FIG. 5. The processor also receives a DC input of approximately 9 volts at the processor input terminal $V_{ss}$ from the power supply in the interface device. The display 28 and the keyboard data entry means 26 are selectively controlled and scanned from the output terminals R and O of the processor terminal 16. That is, the output terminals $R_0$–$R_7$ selectively scan the six time-temperature digits of the display 28 in sequence and output terminals $O_0$–$O_7$ activate selected segments A–G of each digit in accordance with the scanned sequence. Output terminals $R_7$, $R_8$ and $R_9$ scan the keyboard switches of the data entry means 26 and input signals indicative of the positions of those switches are received via processor input terminals $K_1$, $K_2$, $K_4$ and $K_8$. Similarly, output terminals $R_8$ and $R_9$ control and scan the day-of-the-week indications of display 28 and processor terminals $O_4$, $O_6$ and $O_7$ control operation of the display indicators 72–75. Processor terminals $R_3$–$R_0$ scan the mode switches 62, 64, and 66 and input terminals $K_1$, $K_2$, $K_4$ and $K_8$ receive signals indicative of the position of the switches. Terminals $R_{12}$, $R_{13}$ of the processor provide control signals for operating relays 97 and 98 as described below. Output terminals $O_0$ and $R_{11}$ of the processor scan the A/D converter 2 which is enabled via output terminal $O_0$. The A/D converter is not continuously activated to avoid heat build-up problems in the sensor 20.

In the preferred embodiment of this invention, the A/D converter includes a resistance bridge (not shown) and a comparator (not shown) which compares the voltages on each side of the bridge and transmits a comparator output signal 23 to the input terminal $K_1$ of the processor when the bridge becomes balanced. The bridge includes the temperature sensor 20 and a resistance ladder having resistors whose resistance values are binary coded. These resistors are selectively switched on by the digital processor 16 in a sequence corresponding to binary coded 1° F. step increments in the ambient temperature in the zone 14 until the bridge is balanced, whereupon comparator output 23 changes state (i.e. changes from a logic "1" to "0" or vice versa), thereby informing digital processor 16 that the ambient temperature as measured by the temperature sensor 20 has been reached. The digital processor compares that ambient temperature and real time with coded time and temperature instructions stored in the RAM 54 and controls the heating and cooling system 12 to maintain the desired ambient temperature in accordance with the stored instructions.

The processor 16 controls the actuation of the triac means 32 to regulate the system 12 as shown in FIG. 5. That is, the processor activates the relays 97, 98 in accordance with setting of the mode switches 62, 64 and 66 and applies a gating signal via the output terminal $R_{14}$ and the interface device 95 to turn on the triac means, thereby to drive AC current to the heating, fan and/or cooling relays 38, 42, 46 and 50 via terminals 99 of the thermostat in dependence on the state of the mode switches.

If the fan switch 64 is in the AUTO position as shown in FIG. 5 for example, the fan is automatically activated in synchronism with the heating or cooling means of the system 12. That is, for example, if switch 66 is in ON position as shown and relay 98 is positioned as shown for HEAT while switch 62 is in AUTO position as shown in FIG. 5, the triac means 32 when triggered by the processor 16 drives AC current through the fan relay 46, operates the control relay 50 to position the change over valve of the heat pump for heating, and drives AC current through the heat pump. If the fan switch is set in the ON position, AC current by passes the triac means 32 and drives the fan relay regardless of whether the heating or cooling means of the system 12 are activated. If the fan switch is set in EMER HEAT position, the processor changes the position of relay 97 and activates the auxiliary heating means 40 and the fan 44, also bypassing the triac means 32. If the mode switch 66 is positioned in SET position, the heating and cooling means of the system 12 are not operated but the thermostat 10 is adopted for user programming. If switch 66 is positioned in OFF position, the system 12 is deactivated and programming is not enabled. If the mode switch 62 is set in HEAT position, the system 12 is operable only in the heating mode and if it is set in COOL position, only cooling operation of the system is possible.

As microprocessor-based controls are well known and commercially available and are adopted to be readily assembled by those of ordinary skill in the control art interconnection of the above-described components of the thermostat 10 and of the multistage temperature conditioning system 12 are not further described herein and it will be understood that the interconnections schematically illustrated in FIG. 5 are complemented in any conventional manner within the scope of this invention. Of course, other circuit components are also adopted to be incorporated in the circuit arrangement shown in FIG. 5 in accordance with conventional practice as will be understood. In that regard, it will also be appreciated that although system 12 is shown to incorporate only one main stage heating component 36, one cooling stage 48, and one auxiliary heating stage 40, the system is adopted to incorporate more than one main system stage for either heating and/or cooling, more than one auxiliary heating stage, and one or more auxiliary cooling stages within the scope of this invention. Further, although the thermostat 10 is primarily described with reference to regulation of the system 12 having one main and one auxiliary heating stage and one cooling means, the thermostat is also adopted to be modified in conventional manner to regulate operation of systems having other main and auxiliary heating and/or cooling stages within the scope of this invention.

Preferably, the thermostat includes a battery power supply which functions as a backup power supply for the processor in the event of failure of the main system power supply. This permits the processor to retain any user supplied information programmed therein and to continue keeping real time.

Figure 6A:
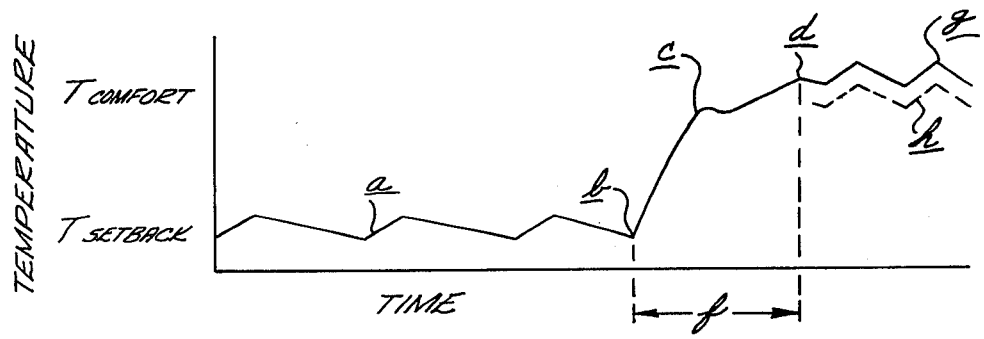
FIGS. 6a and 6b are graphs illustrating operation of conventional thermostat means; typical operating conditions.
Figure 6B:
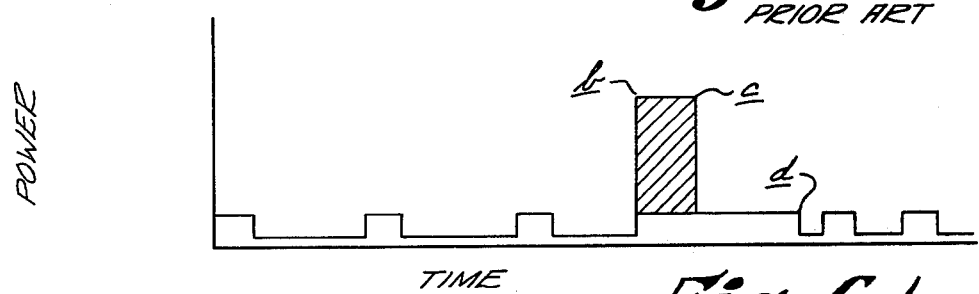

In this regard, it will be understood that when a conventional electronically controlled digital thermostat is used to control a multistage temperature conditioning system having an energy-efficient heat pump in the main heating stage and having a less energy-efficient electrical resistance heater in an auxiliary heating stage as above described, and when the thermostat is adopted to provide energy-saving temperature setback during the nightime for example, the threshold temperature of the main heating stage typically corresponds to the desired setback temperature, $T_{setback}$ in FIG. 6a, and the threshold temperature of the auxiliary stage is frequently set 2° F. lower than the main threshold. At the end of the setback period, the main stage threshold is reset to a relatively higher comfort temperature, $T_{comfort}$, and the auxiliary stage threshold is also increased to be 2° F. less than the comfort temperature. The thermostat compares the actual zone temperature to the two noted threshold temperatures and activates one or both of the heating stages if the zone temperature falls below the respective threshold. In that arrangement, the zone temperature normally fluctuates around the desired setback temperature during the setback prreriod as indicated at a in FIG. 6a and, at the end of the setback, both of the main and auxiliary heating stages are typically activated as indicated at b in FIG. 6a to begin to restore zone temperature to a comfort level. When the new auxiliary stage threshold is reached as a zone temperature is being restored, the auxiliary heater is deactivated as indicated at c while the main stage continues to operate until the comfort temperature level is reached as shown at d. In that system, the recovery from the setback temperature is largely accomplished by the relatively less energy-efficient auxiliary heating stage of the temperature conditioning system. That is, a substantial part of the energy expended in restoring the comfort temperature as indicated by the shading at e in FIG. 6b is attributable to the less efficient auxiliary heater even though earlier and the longer operation of the more energy efficient main heat pump stage of the system might have restored the comfort temperature at the desired time in a more energy efficient manner. Substantial energy savings are therefore lost. In fact, in using multistage heat pump systems under some climatic conditions, the energy expended in restoring comfort temperatures after a temperature setback period can use up a large part of the energy savings which had been achieved by the temperature setback during the entire nightime setback period.

The conventional thermostat control also tends to result in other energy losses as well as in some difficulty in maintaining comfort temperature at a desired level. For example, the period of time indicated af f in FIG. 6a required for full restoration of a comfort temperature after a setback period can vary substantially with the conventional control system depending on existing climatic conditions, on the thermal characteristics of the building in which the temperature conditioned zone is located, and the capacity of the temperature conditioning system relative to the size and other heating requirements of the temperature conditioned zone. Under poor conditions, the desired comfort temperature may not be restored until long after the time desired and can result at substantial discomfort to the system user. On the other hand, where the temperature setback period is scheduled to end at a selected time to permit the desired comfort level to be restored an anticipated time thereafter, the conventional control can result in premature restoration of the comfort temperature level under mild weather conditions and that premature restoration can result in loss of potential energy savings.

The conventional system also can result in poor control of the comfort temperature under some weather and housing conditions. That is, the conventional system normally permits the comfort temperature to fluctuate around the threshold temperature of the main stage heating means with some hysteresis provided by the thermostat to limit cycling of the heating system as is indicated at g in FIG. 6a. Where such fluctuations do not exceed the 2° F. threshold temperature differential between the main and auxiliary stage thresholds, the comfort temperature is maintained by activating the main heating stage of the system but the auxiliary heating means may also be activated where larger temperature fluctuations occur. However, where weather conditions are more severe or where housing or capacity limitations of the heating system are more critical, so that operation of both of the heating stages are necessary to restore the desired comfort temperature level, the zone temperature can fluctuate around the relatively lower threshold temperature of the auxiliary heating stages as is indicated by dotted lines h in FIG. 6a. This again can result in substantial discomfort for the user of the temperature conditioning system.

In accordance with this invention, the thermostat 10 provides improved control of temperature in the zone 14 while achieving improved energy savings by utilizing a new method for controlling the main and auxiliary temperature conditioning stages of the system 12. In accordance with this invention, the threshold temperature of the main stage of the system 12 corresponds to the temperature scheduled to be provided in the zone 14 during any selected period of time. Accordingly, the main temperature conditioning stage of the system is activated by the thermostat 10 to initiate heating or cooling to provide that set temperature at any time an actual zone temperature varies from the scheduled set temperature to a selected extent. In that regard, the thermostat preferably provides selected hysteresis as noted below to limit cycling of the system 12 as will be understood. In accordance with this invention however, the thermostat 10 continuously senses the actual zone temperature while the main temperature conditioning means of the system 12 is operating, periodically determines the rate of change of zone temperature actually being effected in the zone 14 by such operation of the system 12, and actuates the auxiliary temperature conditioning means of the system to aid the main temperature conditioning means only when the rate of change of temperature actually being effected in the zone 14 is below a selected or desired optimum rate of temperature change. In that way, the thermostat 18 consistently regulates zone temperature with respect to a single threshold temperature and provides more, or less, auxiliary temperature conditioning as may be required to maintain the zone temperature with respect to that single threshold temperature. The thermostat thus provides more consistent and reliable control of comfort or setback temperatures as outdoor climatic conditions may vary from mild to severe even where the building housing the temperature conditioned zone may have very poor insulation or other thermal properties and even where the temperature conditioning capacity of the system 12 may be limited with respect to the temperature conditioning requirements of the zone 14. The optimum restoring rate is selected to be typically within the capacity of the main stage temperature conditioning means and also to assure maintenance of a comfort or setback temperature at the desired level and to provide suitably prompt restoration of a comfort temperature after a setback. Typically, for example, the optimum rate for heating is selected to be about 6° F. per hour after an initial period of 10 to 30 minutes during which the main stage conditioning means operates by itself. Of course other rates are also possible within the scope of this invention.

In addition, the thermostat 10 of this invention provides improved energy saving during the setback temperature type of operation of the system 12, particularly where that system incorporates heat pump main stage temperature conditioning means. In that regard, the thermostat 10 senses actual temperature in the zone 14 during any scheduled period of time and compares that actual temperature to the temperature scheduled to be provided in the zone in the next scheduled period of time. The thermostat periodically determines whether any operation of the main temperature conditioning stage of the system 12 is required for changing zone temperature from the actual temperature to the next scheduled temperature and determines when any operation of the main stage means must be initiated to provide the next scheduled temperature at the start of the next scheduled time period assuming that the main temperature conditioning means is able to restore the desired temperature at the desired rate of change of zone temperature as previously noted. The thermostat 10 is also adopted to initiate operation of the main stage of the system 12 at that determined restart time to begin restoration of the zone temperature to said next scheduled temperature at the start of said next scheduled period of time. When any such operation of the main temperature conditioning means is initiated, the thermostat 10 periodically senses the rate of change of zone temperature being effected by the operation of the main system stage and, as has been described above, activates the auxiliary temperature conditioning means where necessary to aid the main temperature conditioning means in restoring zone temperature to the desired level. The thermostat continues to monitor zone temperature and, where both the main and auxiliary stages are activated to restore the comfort temperature and where the rate of change of zone temperature being effected by those conditioning means exceed said selected rate of zone temperature, the thermostat deactivates the auxiliary temperature conditioning stage. In that way, the thermostat 10 provides for more timely restoration of the desired comfort temperature after a temperature setback period and tends to utilize the more energy efficient heat pump temperature conditioning means to a much greater extent in restoring the comfort temperature. This is particularly true where weather conditions are relatively mild or where housing and system capacity factors are favorable. That is, in many of such favorable conditions, the comfort temperature is restored in an improved manner completely by use of the heat pump main stage means of the system 12.

Figure 7:
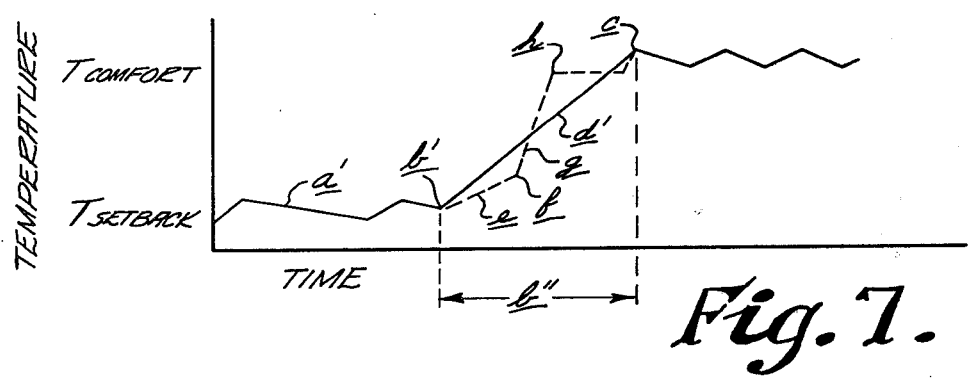
FIGS. 7a and 7b are graphs illustrating operation of the thermostat of FIG. 1 under similar operating conditions.
Figure 7B:
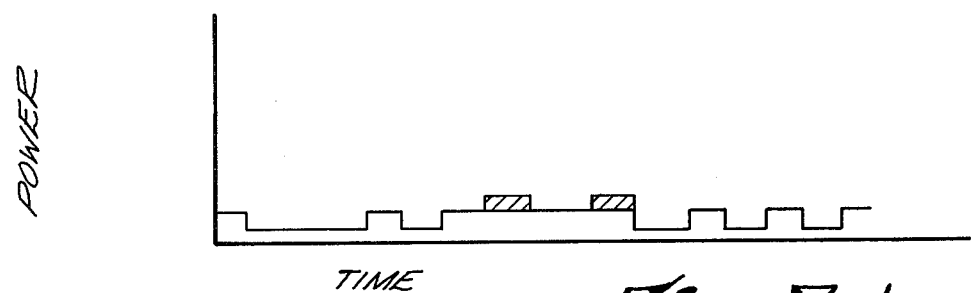

For example, as is illustrated in FIG. 7, the thermostat 10 normally regulates operation of the system 12 during a setback temperature period to maintain a setback temperature wherein the zone temperature fluctuates around a scheduled setback temperature $T^1_{setback}$ with appropriate hysteresis as is diagrammatically illustrated at $a^1$ in FIG. 7a. Preferably, the thermostat is arranged to provide variable hysteresis with time in maintaining such a zone temperature as has been previously described in the latter of the two patent applications previously noted above. During that setback period, the temperature is typically maintained by use of the main heat pump stage of the temperature conditioning system 12 as is indicated at $a^1$ in FIG. 7b. However, if the rate of temperature restoration being effected by the system is too low after any initiation of main stage operation, the auxiliary heating stage of the system is activated as has been previously described above. During that setback period, the thermostat 10 senses the actual temperature in the zone 14 and determines the time $b^1$ when operation of a main system stage must be initiated for assuring that the main system stage is able to restore zone temperature to the comfort level $T^1_{comfort}$ at the start $c^1$ of the next scheduled time period assuming that the main stage is able to change zone temperature at the rate indicated at $d^1$ in FIG. 7a. That is, the restart time for the main system stage is determined assuming that the comfort temperature is to be restored by operation of the main system stage alone as is indicated at $b^1$ in FIG. 7b. The thermostat 10 then continues to sense actual zone temperature, and periodically, at intervals of 10 minutes for example, determines the actual rate of change of temperature being effected in the zone 14 by operation of the main stage alone. If the actual rate of temperature change indicated by the dotted line $e^1$ in FIG. 7a is less than the desired rate such as 6° F. per hour as is indicated at $d^1$ in FIG. 7a, the thermostat 10 is adapted to activate the auxiliary heating stage of the system 12 as indicated at $f^1$ to restore the zone temperature at a faster rate $g^1$. Similarly, if the thermostat determines that after another 10 minute interval that the rate of change of temperature with operation of both the main and auxiliary heating stages exceeds the desired rate $e^1$ as indicated at $h^1$ in FIG. 7a, the thermostat deactivates the auxiliary heating means leaving the heat pump operating alone. When the system 12 restores zone 14 to the desired comfort temperature as indicated at $c^1$, the thermostat deactivates the main system stage and/or any auxiliary stages of the system which may then be operating. In that arrangement, the thermostat 10 provides for improved energy efficient control of multistage temperature conditioning means.

Figure 8A:
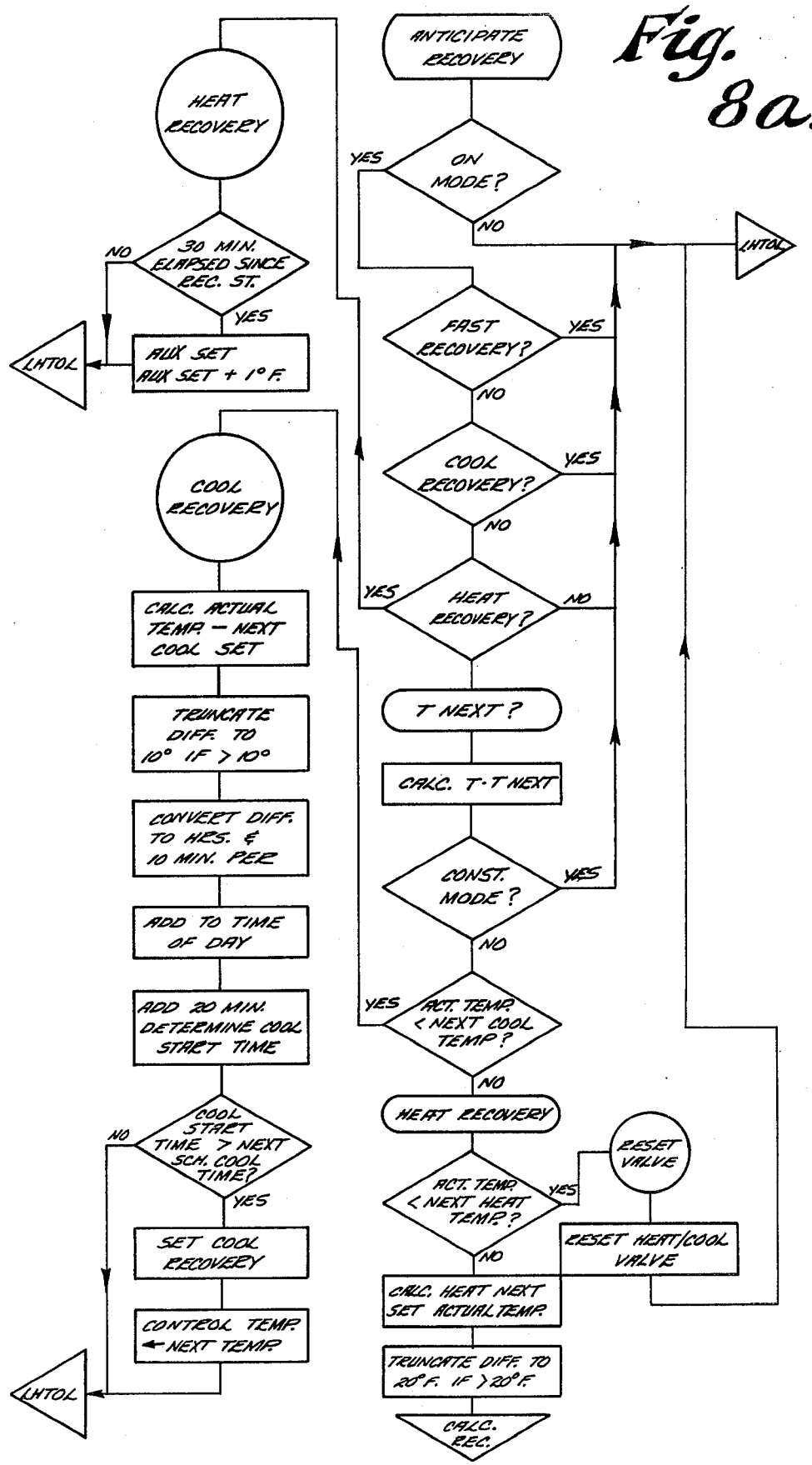
FIG. 8 is a flow chart illustrating a routine used in implementing the control concepts of this invention.
Figure 8B:
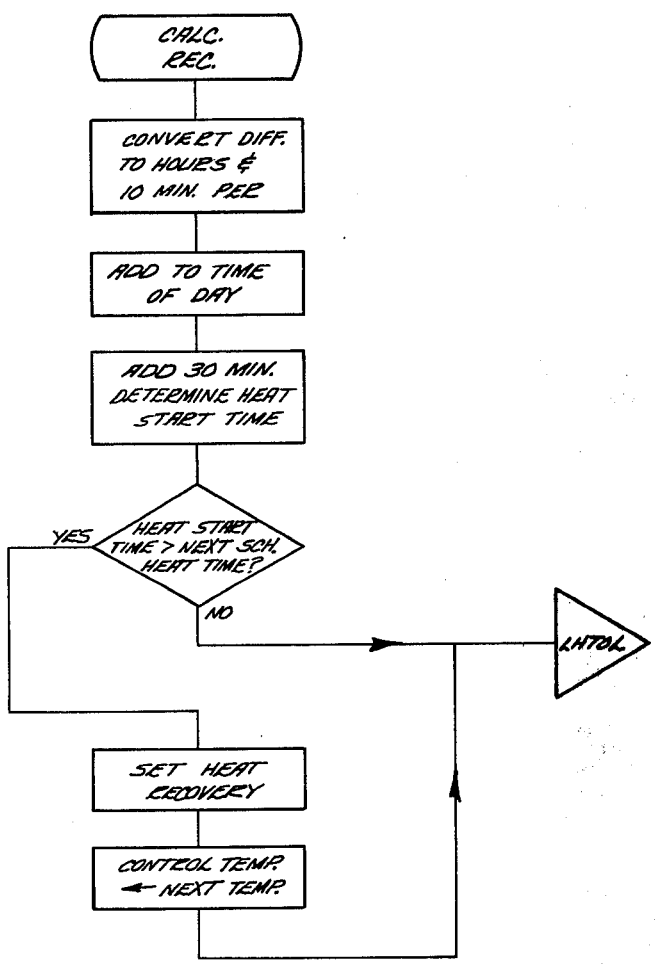

In achieving these advantageous results with the thermostat 10, the ROM 52 of the processor 16 or other comparable memory means incorporated in the thermostat is provided with a full permanently stored set of digital coded instructions for controlling operation of the thermostat in the manner above-described. As the functions of scanning and controlling operation of the Sensor 20, A/D converter 22, data entry means 26, display means 28, mode switches 30 and processor 16 and the like to permit programming and display, to schedule comfort or setback temperatures in a desired time-temperature sequence, and to adjust the threshold temperature of the main heating and/or cooling stage of the system 12 are known and have been described for example, in the two co-pending patent applications noted above, the instruction codes or, basic routine for accomplishing those functions are not set forth herein and it will be understood that they can be implemented in any conventional manner within the scope of this invention. Preferably, they generally correspond to those described in the two patent applications noted above but other conventional routines are also used within the scope of this invention. In accordance with this invention, those instruction codes for the basic routine are supplemented as set forth in Table I below to provide supplementary routines for accomplishing operation of the auxiliary heating or cooling stages of the system 12 in the manner above-described and for accomplishing anticipation and recovery of a comfort temperature from a setback temperature in the manner which is also above-described. The algorithm/source code corresponding to those instruction codes for the supplementary routine are set forth in Table II, and the flow charts of FIG. 8a and 8b diagrammatically illustrate the control logic of the processor 16 in carrying out the supplementary routine to implement the novel and advantageous temperature conditioning control concepts of this invention.

For example, where the system 12 includes a heat pump for main stage heating and cooling and has a single stage of auxiliary heating, the basic routine of the processor is adapted in any conventional manner to periodically reference the supplementary routine illustrated in FIG. 8 to update the need for suxilliary heating and to anticipate recovery from setback temperature. Typically for example, the supplementary routine is referenced at intervals of 10 minutes. The supplementary routine first determines whether the system is ON calling for temperature conditioning and whether the system is to be operated in the fast recovery (emergency heat), cooling or heating mode. If not in the ON condition or if in the fast recovery or cooling mode, a direct signal is provided as indicated at LHTOL to immediately provide auxiliary heating (for fast recovery) or to signal ommision of auxiliary heating (for OFF or cooling mode). However, if the system is in the heating mode, the routine first determines whether a desired, initial, 10 to 30 minute period of operation of the main stage heating alone has been completed. If not, a direct signal provided as indicated at LHTOL again omits auxiliary heating. However, if the initial period is over, the signal provided at LHTOL enables the auxiliary heating and increases the threshold temperature of the auxiliary heating stage from its original setting in 1° F. increments at 10 minute intervals (each time that the supplementary routine is referenced), the original setting of the auxiliary heating corresponding to the temperature at which the main heating stage last changed state from OFF to ON. In that way, if zone temperature has dropped below the main stage temperature while the system 12 is scheduled to maintain a desired comfort temperature or setback temperature so that the main stage has been activated to restore the desired comfort or setback temperature, or if the main stage threshold had been increased to initiate main stage operation for recovery of zone temperature from a setback temperature, the incremental increases of the auxiliary threshold temperature corresponds to the desired temperature recovery rate of 6° F. per hour. If the main stage heating is not recovering zone temperature at the desired rate, the auxiliary heating is activated as its threshold increases to exceed zone temperature. Similarly, if a period of auxiliary heating increases zone temperature at a rate faster than the auxiliary threshold is incrementally increased so that zone temperature exceeds the auxiliary threshold, auxiliary heating is discontinued.

When referenced, the supplementary routine further includes a sub-routine which determines the temperature to be provided in the zone in the next scheduled period of time provided in the thermostat proram, compares that next temperature to the actual zone temperature, determines the time prior to that next scheduled time for restarting the main system stage to recover the desired temperature at the start of that next period, and, if necessary, initiates such restarting. That is, the routine determines whether the system is to be operated in the CONSTANT mode (and provides a direct signal at LHTOL if in that mode), whether the actual temperature exceeds a next scheduled cooling temperature or exceeds a next scheduled heating temperature, and whether the heating/cooling reversing valve of the heat pump is appropriately positioned. The routine for heating for example, then determines the difference between the actual temperature and the next scheduled temperature, truncates that difference to a maximum such as (10° F. for cooling and 20° F. for heating for example) to avoid excessive periods of recovery, converts the difference to a desired recovery time assuming the desired rate of temperature recovery, adds the recovery time to the time of day to determine when restarting is to be initiated, and preferably adds an offset period such as 10 to 30 minutes to assure prompt restarting if the calculated restarting is imminent. The routine also determines whether the actual time exceeds the calculated restarting time for then setting the system to begin appropriate temperature recovery.

It should be understood that various other routines are also within the scope of this invention and that such routines are adapted to be extended in known manner for regulating system 12 with other combinations of heating and cooling stages including systems having several heating stages and/or several cooling stages.

It will be understood that, although the embodiments of the invention as described above have been described principally with respect to the provision of heating in the temperature conditioned zone, the thermostat 10 is adapted to provide comparable control of temperature conditioning systems in both heating and cooling modes and to provide control of multistage systems incorporating one or more auxiliary stages in addition to the main system stage, It should also be understood that although the preferred embodiments have been described as being implemented by microprocessor means, this invention can also be implemented with descrete logic circuitry within the scope of this invention.

TABLE 1

```
TMS1600 OBJECT:  'T4FAA 'CREATED BY VERSION LC.A ASSEMBLER (6/79)
4F4EDE282DDE0821494DFADE630CBC0AA30D203F601E207F0440300F0A414D2h
000F9E2EB71E94041E0D820C0C187788870D3728414903384C280CB4283B230D
00A7434F8C0C18102E10FD052C0B83F1004638801012345F464F4F1F2940424.
0d603A0FA61734EC8189D12D2C2C852E606032803A408070481460002142F27
2F27942B27696A4E4C20332C2929A1071C13695A270F3B4F2B4042442B0769D4
8d07B494294A90150F94904C8B2B30844407300B072F6F074C18D46CCC740740
2d4F3E3A8F7A27B92E442CAE283FBA2E0F42482C282173A374454F433EAD8246
8F603B796E482138272949;3EA12C6039869B274636406?407A2E2C298F803A1..
2340176040803982822C460F62822B490A4D406023084A2334400C2E563F9FC0
0FA90D4F332E6E4E0236272?3580FB563A2A0C6FA7621A049A4A820C0F8B0E2E
4A0027B1932E2B292B9CAA224A6229.4A8E4A88F54A9C220C2C39629C174C6E39
```

TABLE 1 (cont.)

```
9C08384E9C3A2C313B70292E0D4E0F464A27AA34764A2B9C8029313F4A4E2BH6
423B74BF707017765E80708470BD1E BD1686971B7080391E8680705170703636
8610159326707498D1B1542B01170762D701D598016A421B322804A2E2 867
29462C07174E42BC44BF4160A364A36C006E4D4000636D2A2D313560603 5F46
0060282A6028393B002998410F40421B4D8637403728207139F3544272A0621
2F402919SC402B3BA2A627320F56699B008C298C0019622F66415AAD227 H663A
00622E8C52282A4A008C8062622D464446086212B92448C645E642A6340 A11B3
2F44072178AE1128238C486675BC634F004F177B272278668272A3A3F3E927
00443E91BD2F994A9264207EB03227630F1B0F344A98889286927E6B61AF78BC
2D4062346260BD2F60601B606140276216604424F4AA94F622A22151B29282A4A
80626217602140ZF212A2E0F6FB4624A44322D48DE6F3B694021414A4D2B686D
2F40273B4A971DBD4A68606464689613156966F2A1960460F756441461368903A
9C722B9D2F644438E24F28603E28A4 3A8B38604065646AB340BD463817421D6B
41281D1960A464E2A61089384029BC27902D4280074D7E80A139A24D2A46112F
000F4DA7393B2D1D942E14B0271E30B36A36892765762424A413E2907963F44
2F40273921OFOBBF8F41608F4F1E071717294F23666002B216B159F382 64BD
91 4842182744254D6028606E4DCE46462F8F2A2AA996482AA38F3F30ECB3382D
10C198182A23520B3B44A90208B32710BD8508664A60310A082780184821 2E80
003B9205278CFD0861DE2BB40E10290A27AD3B2E3539AD023F0F4F7F46466F4F
0128424F6160487FC32F0CE7406B6D2410EU0FC3144C2E4DE70D6D51466A208F
8CC34AC32B08ED410B61276EC341626F292D2FC3600F8D6F6C2A666FC3416F0F
0E8881Z2E8018B042FD39133BBD1C483B1E131A873A3B91B23F3899OB80.3F0FBC
801E3B1CB09C3A859D91823F4C3939EC8A9FBC3F3A441C183A403DOB25 1 BC39
100B4A35933B5D15288C37941AB670AA00242B51471EA1459B801A9A2F80713C
002B5D24210B9214AEE1B470709C0F21932814A980BC5146217070Z2FA1604D28
18E1E12D1A2E85218480AA21218428288O515D47A6A851281A28211B5D248024
0018AD5191552C211A24519B32A241A808D24292896E183A3E15D5118AFBB5D
3428214F28483A211A4642271CAD274E1283123F46124541444A4412404D4A27
B7491244C494B9426FA28027212A2121272A3F21394CE54B27432127274Z147
3FBF4A2828212740464C287B6F467E3A1368386F0F6FAEA4B66F346A2132.3090
86BBB67927486FA9B61C6F73704E4A2A4686B67A0F212A4E7B214A64A9644A28
1E812A2A8C4DA54E4C4680222A2F953797B2708C222F4E338230A244392VB94
0095228DA6174C3B2A8948823F73423F163A0F42703F21468D2E46BFAE043734
2A403539481E2A822822AC81B50F463100A3A32A17F4994C341AB1B06F39 394C
00A22F6F403437E48028E4394828284A136FCD3A4E424BF66F4AA23AF44CD739
3410460B1E3F691784811EAE304580BD0027603800BB1D702F3775070F2C6029
002B0F916A37A53B0049009AA10F284C210781118439272A92B1C324A81933B
2F403E30F797AA8211E4BB3219AA1193278278134607977AA47D6079A44D1E8C
BF43A63E47844B702D3E60B027A427B0604H8AB1477A271960743E9ED839704A
2849743E93B6077A4B274F70108949HD006C071EBF3361A3930B896A07214579
00D8644389D7819300471193610740F1E69118E69964B27897E7E3E2160AF27
294D4E629D0792282B2C00A3103548410046104E0000802A1D0B2B293962486F
002914270BAF600F0030001DC7324F2FB592182A4A6040218D60664D252A6F4F
642F4244931E496045A5303819214A290021A549000062AE607D2E75451F3544
002E7EAE2819212A003A00606084283ABB7993604248AE40214DAC2D37313270
371B3780392F103512E82A4E380B80140CBF122EB2402907368A3B111E2CB80B
0FA5489C8A814C12454A349C4C4FB1141B271E0B883AD70B81144F143436B718
2D402F3A3B3E749F0F994C713239F39D1E2E4D291C3927B84D1EA9A9272C552C
80A4424C272F401B0B2B99AC2B3A7604072E810B763E7D9D7F104E3FBB47DD11
2A44B439982AA58C2A40444B452A2E4E0040343003040302E0D8044464C3734
00393039AE2ABC880048AD2A34162C4046A5BD3A2A8834893B46333A2C440C45
2B4A296089469612EAC294A6C2B2F2A42912C89404A6E602F644E803968486F3B
000F1532152E310F613B2C606015466F6440626F2F669141294F62286F8D39B4
1F3841800F6D48186C2B4F6460632E3A18646E41416148664F61B6636E416E8F
802961204B6160616B612F6A69514B6661614B4F6B6A6D61686E636D60412A10
666E34100432366E4945D518DF10F7710D7773C8AE19A974FAF0F284736B1210B
```

TABLE 1 (cont.)

```
994F8C30918390A1992E90AC51453428974F148E215D9A478D3C04AF2A458417
45878E471C182D28188318D78A3C0F2100F1935100D7518E851888ADB1105D29
00E10F218AA2B1F1005DA2BD877745041828E118041799B347850B7796B0BB30
4587D747178E9B280FBD18458A990F210010185100D7A19CE1185D77281C5D2B
00180B3CF1889CF1008A888718044704BE2FE11B935192B321A1AE77B5ACBB3C
2E42217F2B287039214F974F80A2ADBD1EAA291A44754A1E4D2F1216853A4D75
BC2D63A9423B3B39606B2F2A367D009522741A40AA95803B1295AB403F2DBC1E
38870F9193397F2F97864586BD780F3B002FBD38111B5D7F2B1BB11616853CB4
00353BAF1A948631A738EC04BB2B702F4F1EF64F2F98D321D32B772BBA47861A
284F296D383B3B7F38AB299300937074008EBC2F344D74703B8ABB123B2AA92D
0070932A93804488B233367F2D382E3B93701E3B93849529932E3B7070AD3B4F
2F44B9274D292A0F8028624D6FAF42791711567662A4134136FAF29283921BA
B91780B13B4E652E0F4A4C28272E3641851229272BA1AF2D4F4DAB9B2E70AD70
284127212AB8912E924F9A258D18494200179531C417253E7B1714EDAC21701C
0079EE3819C40F28A438C0793E99271A82FDDD3C08B388A181B7D74991A803B
74953A7040973AA83932A6B149B6EE17DD3C2A1EBF17D31BC428EC92113AB3EE
BFC029CB4F1E901417C4C01B111BF6791C1C672711B045BCC43EAB7925214925
2F461D22177038580FC0C4B19B3414BEC4133811EEB444702117992E15C3B61B
88809E29AA11C4DB114F172F1D388B7C79D3DD182AF84F211BF7141D184F28B
17EEC42ECE9F153A7B1B38171DF4C498A58021EC111BC4C017381C9FDA5B92
00111BDD13152B11C444F611BBC3153ADD1795D3EEC01C4FBB1B172DA5BA3A4
1BF6B92F04292E3A4104464D044E2ABF122C49041C6F4F3A3928B1213 4F2F9E
9F1721A1D10F04AB0BD1442A1E2786C4841E278E45A14D11863A35EC4C1BCE1F
2F465D210F9C90718B90AA4F21472B8E17515DCEA68B0F33212D2196514A7070
B924AD1B915D28920F24514528288B1802F0F24AE2B8DCE70AC703B179D9370B6
1BCE512824B524212855000F515DBD2900211B8C00002EB95D88B8ADCE1B8324
00BD2C2ACEB9B21700B9002124511B5182210F0B0F28BDBC2810CE330F4FAF5D
28400B231F100E028E811AF14A9310 0A3F1027230BF50B42F8270840100BB761
00100BCF380B2E6F174C1C10102F27514F1210440CC10D690B0D1040452A9F51
45232E4D4622202E2F2C18533B2181228A4D160F39302D9C4580B02C2A6020 2F
004D21299E3D1851B20FC8AA9E51862B238679246010249655B2C0F53219EBB5B
2C419779C1188085180F0BE5072C9770000B0F2C0F1E972ED3A9A4411A1870AC
00D3191C601841180027F8CD187346B5188064C874183E703A18CDA79D70B070
36470C0C1D2E434346853542FF0D4C0C003A8E2E1237 2C3A3A1336851A3887A9
0043930C2C841B2E9E1A0F0D4646A90D8647D50C37472C47B14BB10D344B3630
2C4E8B2114A3D475983A9477984849BF352E3BB62C10B8B3212E2C128C3C35AE
AE3C4212803810214612807740A11ABC41B8424846B5393C12B8AB45772144 C
37364616FE3993C01B9E2F98392C2F8A14FF1B2C294E1B311AA533469E4D4E2C
8A2C1639FF3546374DC0640BF89812958E29984F1B183B1E4860609F2C242821
29482C39C84639B7104F003B33AC292E0088793B000035BC93133B1DBF483A42
0014184CA288888000880036154F3942342FE217A296802E80BD39BFB31CB338
2F4D2121182C184C9ACD1846B0D3702C0018181800CD8A1A99181818929A2C27
004DC8E5D3B0CD9200BA997970BA3A8F2F18C879E521D342AD214C21424D2F0F
2E423C39938626BF3EAD0F794D9C3815BF272860274028262B603D2805928293
002C7A0F4B9988131C0F757F49EB703906985F8F928ECC135D3A198F1E3B4D29
2F449F210B29114F111C191914B53479F89B3BEE0BB93B3B2E0B9C2B2D7F7098
8A3B14AAA2C38A3614111419B73B80B5193B1C9B2F2A117011700F9CB4708570
140B4E14B227B6C34528641B1B1D11B9152188494D893DF63A8B1EB4C0C01814
842E7B3DAA60660F603D29934FD8100B93EB4921EB3D10141E4115B9F7DB180B
432C79061B15C0280BF6309E174F0B069A1CD310642F7026BCBD183815112653
00ABC911104D0B1815144E2615B2787A7AC029810B0F9AABBC5FE47A05977CB0
2C4E97210F364E75A23D49961D60A4BF217921901360152C2CE496463A772196
8C3B258A3D943E14804968AF9332462C46133D9D2C040F44AD3C98982E3B4D29
2349106448D89A1E3F18E27FC33511D986B22F0B2C1B2978320F3337EBC0601E
009A2E3D4E9319C01D93FFB04DBC1E25154D151515381E4329784F217F284BDB
442C2721210F742E0F282A1E1F152124A52E4E488C047AD9798821B1DB3D6981
0043427F0361274946036997AB04E1EB928E74A0F4D3D2E071B27B06407B90740
```

TABLE 1 (cont.)

```
140B7013389A3AB43A91A8701F980C28A88C391FB21B2E8C213B1F383B4B514C
8C7A1BBA8939884338863A0C4A881F602C398A0C3B47AE4080450C2AAFBF516F
28400F6F8EF0480F1444426A4C2A0D6CA40B47CDA4CDCFBBC0CD202364884063
00641FBB0DA48845450F4BCFBB2AC02A6AF043BC6968616FF051C04E696CCF0F
```

TABLE 2

```
                 *
                 ***ANTICIPATION & RECOVERY
3 7 00 2E ANTREC LDX    3
3 7 01 42        TCY    4
3 7 03 39        TBIT1  2       ON MODE ?
3 7 07 BF        BR     ANTP
3 7 0F 15 ANTEX  BL     PREXIT
3 7 0F 93
3 7 3F 29 ANTP   LDX    4
3 7 3E 4D        TCY    11
3 7 3D 3B        TBIT1  3       FAST REC ?
3 7 3B 8F        BR     ANTEX
3 7 37 13        LDP    QFREC
3 7 2F 39        TBIT1  2       FAST REC QUAL ?
3 7 1E 82        BR     QFREC
3 7 3C 1E NORM?  LDP    ANTEX
3 7 39 3A        TBIT1  1       COOL REC ?
3 7 33 8F        BR     ANTEX
3 7 27 13        LDP    HTREC
3 7 0E 38        TBIT1  0       HEAT REC ?
3 7 1D 92        BR     HTREC
3 7 3A 19        BL     TNEXT?
3 7 3A 8E
                 *
3 7 2B 7F TS-TA  CLA
3 7 16 28 TS-A   LDX    0
3 7 2C 49        TCY    9
3 7 18 28 S1     LDX    0
3 7 30 06        AMAAC
3 7 21 2C        LDX    1
3 7 02 3C        SAMAN
3 7 05 86        BR     NOBOR
3 7 0B 79        A10AAC
3 7 17 26        TAMZA
3 7 2E 70        IAC
3 7 1C 05 INCYS  IYC
3 7 38 5D        YNEC   11
3 7 31 98        BR     S1
3 7 23 0F        RETN
3 7 06 26 NOBOR  TAMZA
3 7 0D 9C        BR     INCYS
                 *
3 7 1B 28 DIVID  LDX    0       MAX DIFF > 10  IN COOL
3 7 36 CC        CALL   CREG    AND > 20 IN HEAT.
3 7 2D EB D1     CALL   TS-TA
3 7 1A 3D        CPAIZ          BORROW ?
3 7 34 92        BR     INCC    NO.
3 7 29 0F        RETN
3 7 12 28 INCC   LDX    0
3 7 24 4B        TCY    13
3 7 08 3E D2     IMAC
3 7 11 27        TAM
3 7 22 7A        A6AAC          INCR RESULT
3 7 04 93        BR     D3
3 7 09 AD        BR     D1
3 7 13 60 D3     TCMIY  0
3 7 26 88        BR     D2
                 *
3 7 0C 4D CREG   TCY    11
3 7 19 60 RPPT   TCMIY  0
3 7 32 5F        YNEC   15
3 7 25 99        BR     RPPT
3 7 0A 0F        RETN
                 *
3 7 15 40 ADD11D TCY    0
3 7 2A 75        A11AAC
3 7 14 27        TAM
3 7 28 1C        BL     COMPQ
3 7 28 BF
```

TABLE 2 (cont.)

```
                  *
3 8 00 2F  TTNEXT  LDX    7
3 8 01 44          TCY    2
3 8 03 21          TMA
3 8 07 4F          TCY    15
3 8 0F 79          A10AAC                SCH CR= 6?
3 8 1F 98          BR     A2NX
3 8 3F 70          IAC
3 8 3E 85          BR     A3NX
3 8 3D 70          IAC
3 8 3B 9C          BR     A4NX
3 8 37 70          IAC
3 8 2F B5          BR     A1NX
3 8 1E 70          IAC
3 8 3C B4          BR     B2NX
3 8 39 70          IAC
3 8 33 9B          BR     B1NX
3 8 27 36          RBIT   1                C > B2.
3 8 0E 34          RBIT   0                C < B2.
3 8 1D 7F          CLA
3 8 3A 0F          RETN
3 8 35 2A  A1NX    LDX    2
3 8 2B 19          LDP    EQ>2T
3 8 16 3B          TBIT1  3
3 8 2C B7          BR     EQ>2T
3 8 18 2E  A2NX    LDX    3
3 8 30 19          LDP    EQ>3T
3 8 21 3B          TBIT1  3
3 8 02 9F          BR     EQ>3T
3 8 05 29  A3NX    LDX    4
3 8 0B 19          LDP    EQ>4T
3 8 17 3B          TBIT1  3
3 8 2E 80          BR     EQ>4T
3 8 1C 2D  A4NX    LDX    5
3 8 38 11          LDP    EQ>5T
3 8 31 3B          TBIT1  3
3 8 23 AA          BR     EQ>5T
3 8 04 11          BL     A1NX
3 8 06 B5
3 8 1B 2B  B1NX    LDX    6
3 8 36 11          LDP    EQ>6T
3 8 2D 3B          TBIT1  3
3 8 1A 8C          BR     EQ>6T
3 8 34 2F  B2NX    LDX    7
3 8 29 11          LDP    EQ>7T
3 8 12 3B          TBIT1  3
3 8 24 A2          BR     EQ>7T
3 8 08 11          BL     B1NX
3 8 08 9B
3 8 22 14  EQ>7T   LDP    CH2
3 8 04 0B          TPC
3 8 09 1C          CALLL  GTEQ7T
3 8 09 EE
3 8 26 8A          BR     RTTXX
3 8 0C 14  EQ>6T   LDP    CH2
3 8 19 0B          TPC
3 8 32 1C          CALLL  GTEQ6T
3 8 32 C3
3 8 0A 19  RTTXX   BL     RTTNX
3 8 0A B9
3 8 2A 14  EQ>5T   LDP    CH2
3 8 14 0B          TPC
3 8 28 14          CALLL  GTEQ5T
3 8 28 F8
3 8 20 8A          BR     RTTXX
3 9 00 14  EQ>4T   LDP    CH2
3 9 01 0B          TPC
3 9 03 14          CALLL  TEQ4T
3 9 03 C3
3 9 0F B9          BR     RTTNX
3 9 1F 14  EQ>3T   LDP    CH2
3 9 3F 0B          TPC
3 9 3E 18          CALLL  GTEQ3T
3 9 3E DB
3 9 3B B9          BR     RTTNX
3 9 37 14  EQ>2T   LDP    CH2
```

TABLE 2 (cont.)

```
3 9 2F 0B              TPC
3 9 1E 18              CALLL   GTEQ2T
3 9 1E F7
3 9 39 41   RTTNX      TCY     8
3 9 33 21              TMA
3 9 27 0F              RETN
            *
3 9 0E 11   TNEXT?     CALLL   TTNEXT
3 9 0E C0
3 9 3A 15              LDP     PREXIT
3 9 35 3D              CPAIZ
3 9 2B 93              BR      PREXIT
3 9 16 3D              CPAIZ
3 9 2C 4F              TCY     15
3 9 18 3A              TBIT1   1           C > TIME(NX)
3 9 30 93              BR      PREXIT
3 9 21 2E              LDX     3
3 9 02 4E              TCY     7
3 9 05 27              TAM
3 9 0B 1B              CALLL   XR711       TPR <---> TNEXT
3 9 0B F6
3 9 2E 10              CALLL   CLCOM       "RETN ?"
3 9 2E C0
3 9 38 1E              CALLL   TS-TA
3 9 38 EB
3 9 23 3D              CPAIZ               TACT > TSET NEX(COOL) ?
3 9 06 B6              BR      HTRV?       NO.
3 9 0D 1D              BL      CLRV        YES
3 9 0D B4
3 9 36 10   HTRV?      CALLL   HTCOM
3 9 36 D8
3 9 1A 1E              CALLL   TS-TA
3 9 1A EB
3 9 29 3D              CPAIZ               TACT > TSET (HEAT) ?
3 9 12 88              BR      HTRV        NO.
3 9 24 AA              BR      RSCHV       YES.
3 9 08 45   HTRV       TCY     10
3 9 11 21              TMA
3 9 22 7B              A14AAC              DIFF>20
3 9 04 B2              BR      DF20
3 9 09 28   DIV=6      LDX     0
3 9 13 49              TCY     9
3 9 26 66              TCMIY   6
3 9 0C 1B              BL      CALREC
3 9 0C 8B
            *
3 9 32 49   DF20       TCY     9
3 9 25 60              TCMIY   0
3 9 0A 64              TCMIY   2
3 9 15 89              BR      DIV=6
            *
3 9 2A 29   RSCHV      LDX     4
3 9 14 4D              TCY     11
3 9 28 60              TCMIY   0           RS HEAT, COOL RECV
3 9 10 15              BL      TS10EX
3 9 10 84
3 A 00 43   ADDCL      TCY     12
3 A 01 2C   ACL        LDX     1
3 A 03 06              AMAAC
3 A 07 28              LDX     0
3 A 0F 06              AMAAC
3 A 1F 53              YNEC    12
3 A 3F B0              BR      CHM>6
3 A 3E 7C              A4AAC
3 A 3D 97              BR      ADDHR2
3 A 3B 7A              A6AAC
3 A 37 AB              BR      ADDHR1
3 A 2F 7A              A6AAC
3 A 1E 26   STAKK      TAMZA
3 A 3C 05   INCY       IYC
3 A 39 5F              YNEC    15
3 A 33 81              BR      ACL
3 A 27 13              LDP     CH1
3 A 0E 0B              TPC
3 A 1D 11              CALLL   TI=24?
3 A 1D E4
```

TABLE 2 (cont.)

```
3 A 35 0F            RETN
3 A 2B 26   ADDHR1   TAMZA
3 A 16 70            IAC
3 A 2C 15            BL      INCY
3 A 2C BC
3 A 30 7A   CHM>6    A6AAC
3 A 21 AB            BR      ADDHR1
3 A 02 79            A10AAC
3 A 05 15            BL      STAKK
3 A 05 9E
3 A 17 26   ADDHR2   TAMZA
3 A 2E 78            A2AAC
3 A 1C 15            BL      INCY
3 A 1C BC
            *
3 A 31 C0   TTXTT    CALL    ADDCL
3 A 23 11            CALLL   TTNEXT
3 A 23 C0
3 A 0D 4F            TCY     15
3 A 1B 38            TBIT1   0       C < TNEXT ?
3 A 36 9A            BR      RSTDS
3 A 2D B2            BR      STHTRC
3 A 1A 18   RSTDS    LDP     CH1
3 A 34 0B            TPC
3 A 29 14            CALLL   DISP1
3 A 29 D3
3 A 24 10            LDP     CH0
3 A 08 0B            TPC
3 A 11 1C            CALLL   ONM
3 A 11 C9
3 A 04 1B   TS10EX   CALLL   XR711   TPR <--> TNXT
3 A 04 F6
3 A 13 10   PREXIT   LDP     CH0
3 A 26 0B            TPC
3 A 0C 17            BL      LHTOL
3 A 0C BD
3 A 32 29   STHTRC   LDX     4
3 A 25 4D            TCY     11
3 A 0A 30            SBIT    0       SET HEAT RECOV.
3 A 15 2F            LDX     7
3 A 2A 4E            TCY     7
3 A 14 64            TCMIY   RECDEL
3 A 28 15            BL      RSTDS
3 A 28 9A
3 B 00 2C   STAGE2   LDX     1
3 B 01 4E            TCY     7
3 B 03 21            TMA
3 B 07 75            A11AAC
3 B 0F BF            BR      CHNP2
3 B 1F 96            BR      REVAA
3 B 3F 29   CHNP2    LDX     4
3 B 3E 4D            TCY     11
3 B 3D 3B            TBIT1   3       FAST REC ?
3 B 3B 98            BR      HTON?
3 B 37 44            TCY     2
3 B 2F 2C   CHNXX    LDX     1
3 B 1E 21            TMA
3 B 3C 2E            LDX     3
3 B 39 3C            SAMAN
3 B 33 9D            BR      AUXS>?
3 B 27 14   AUXS<A   BL      ST2ON?
3 B 27 A4
            *
3 B 1D 77   AUXS>?   DAN
3 B 3A 98            BR      HTON?
3 B 35 04            DYN
3 B 2B AF            BR      CHNXX
3 B 16 15   REVAA    BL      PREXIT
3 B 16 93
            *
3 B 18 2C   HTON?    LDX     1
3 B 30 46            TCY     6
3 B 21 3B            TBIT1   3       HEAT TR. ON ?
3 B 02 97            BR      AUXS>A
            *
3 B 05 36   SECOF    RBIT    1
```

TABLE 2 (cont.)

```
3  B  0B  96              BR      REVAA
              *
3  B  17  2C    AUXS>A    LDX     1
3  B  2E  46              TCY     6
3  B  1C  3A              TBIT1   1           SEC ST ON ?
3  B  38  AD              BR      SECON
3  B  31  13              BL      AD0.66
3  B  31  8A
3  B  06  4E    DD200     TCMIY   7
3  B  0D  60              TCY     0
3  B  1B  46              TCY     6
3  B  36  0F              RETN
3  B  2D  32    SECON     SBIT    1
3  B  1A  96              BR      REVAA
              **
              *
3  B  34  2C    CLRV      LDX     1
3  B  29  49              TCY     9
3  B  12  21    RVBK      TMA                 10'S COMPLEMENT
3  B  24  3D    CMP10     CPAIZ
3  B  08  A2              BR      NX10
3  B  11  79              A10AAC
3  B  22  25    NX10      TAMIYC
3  B  04  0F              RETN
3  B  09  3D              CPAIZ
3  B  13  90              BR      TMAP
3  B  26  3E              IMAC
3  B  0C  1D    SKIMAC    CALLL   CMP10
3  B  0C  E4
3  B  32  3D              CPAIZ
3  B  25  94              BR      NOTRU
3  B  0A  49              TCY     9
3  B  15  60              TCMIY   0
3  B  2A  68              TCMIY   1           >10 =10.
3  B  14  13    NOTRU     BL      NOTTT
3  B  14  80
              *
3  B  10  21    TMAP      TMA
3  B  20  8C              BR      SKIMAC
3  C  00  28    NOTTT     LDX     0
3  C  01  49              TCY     9
3  C  03  64              TCMIY   2
3  C  07  1E              CALLL   RFPT
3  C  07  D9
3  C  1F  1E              CALLL   DIVID
3  C  1F  DB
3  C  3E  4B    SHFRIT    TCY     13          SHIFT RIGHT.
3  C  3D  28              LDX     0
3  C  3B  21              TMA
3  C  37  43              TCY     12
3  C  2F  25              TAMIYC
3  C  1E  60              TCMIY   0
3  C  3C  7F              CLA
3  C  39  78              A2AAC
3  C  33  15              CALLL   ADDCL
3  C  33  C0
3  C  0E  11              CALLL   TTNEXT
3  C  0E  C0
3  C  3A  4F              TCY     15
3  C  35  38              TBIT1   0           D < TNXT ?
3  C  2B  B0              BR      DTSTR
3  C  16  29    STCLRC    LDX     4
3  C  2C  4D              TCY     11
3  C  18  32              SBIT    1           SET COOL REC.
3  C  30  15    DTSTR     BL      RSTDS
3  C  30  9A
              *
3  C  02  10    QFREC     CALLL   HTCOM
3  C  02  D8
3  C  0B  7F              CLA
3  C  17  78              A2AAC
3  C  2E  1E              CALLL   TS-TA
3  C  2E  EB
3  C  38  29              LDX     4
3  C  31  4D              TCY     11
3  C  23  3D              CPAIZ
```

TABLE 2 (cont.)

```
3 C 06 9A            BR     STFRC
3 C 0D 35            RBIT   2
3 C 1B 37            RBIT   3
3 C 36 1E            BL     NORM?
3 C 36 BC
3 C 1A 33   STFRC   SBIT    3
3 C 34 15            BL     PREXIT
3 C 34 93
3 C 12 2F   HTREC   LDX     7
3 C 24 4E            TCY    7
3 C 08 3F            MNEZ
3 C 11 B2            BR     EXPR
3 C 22 2E   INAXD   LDX     3
3 C 04 48            TCY    1
3 C 09 18            LDP    CH1
3 C 13 0B            TPC
3 C 26 19            CALLL  INCD1
3 C 26 C3
3 C 19 0F            RETN
3 C 32 15   EXPR    BL      PREXIT
3 C 32 93
            *
3 C 0A E2   AD0.66  CALL    INAXD
3 C 15 1B   DEAXDO  CALLL   DEAXS
3 C 15 FF
3 C 14 2C            LDX    1
3 C 28 1D            BL     DD200
3 C 28 86
            *
3 D 00 44   TRACAX  TCY     2
3 D 01 2C   AXTR    LDX     1
3 D 03 21            TMA
3 D 07 2E            LDX    3
3 D 0F 24            TAMDYN
3 D 1F 81            BR     AXTR
3 D 3F 40   DEAXS   TCY     0
3 D 3E 07            DMAN
3 D 3D B9            BR     STAXS
3 D 3B 64            TCMIY  2
3 D 37 07   DEAX1D  DMAN
3 D 2F B9            BR     STAXS
3 D 1E 69            TCMIY  9
3 D 3C 07            DMAN
3 D 39 27   STAXS   TAM
3 D 33 0F            RETN
            *
3 D 27 49   ADD6R   TCY     9
3 D 0E 21            TMA
3 D 1D 3D            CPAIZ
3 D 3A B0            BR     REMAIN
3 D 35 3D            CPAIZ
3 D 2B 7A            A6AAC           ADD 6 TO REMAINDER
3 D 16 7A            A6AAC           > 10 ?
3 D 2C B0            BR     REMAIN
3 D 18 79            A10AAC
3 D 30 28   REMAIN  LDX     0
3 D 21 43            TCY    12
3 D 02 27            TAM
3 D 05 0F            RETN
3 D 0B 1E   CALREC  CALLL   RPPT    CLEAR REST
3 D 0B D9
3 D 2E 1E            CALLL  DIVID
3 D 2E DB
3 D 38 1B            CALLL  ADD6R
3 D 38 E7
3 D 23 7F            CLA
3 D 06 74            A3AAC           ADD 30 MIN.
3 D 0D 15            BL     TTXTT
3 D 0D B1
3 D 36 2E   XR711   LDX     3
3 D 2D 4E            TCY    7
3 D 1A 21            TMA
3 D 34 4D            TCY    11
3 D 29 03            XMA
3 D 12 4E            TCY    7
```

TABLE 2 (cont.)

```
3 D 24 03        XMA
3 D 08 0F        RETN
3 D 11 2E KEYSW  LDX      3
3 D 22 42        TCY      4
3 D 04 21        TMA
3 D 09 28        LDX      0
3 D 13 48        TCY      1
3 D 26 27        TAM
3 D 0C 1F BOUT1A BL       BOUT1
3 D 0C 88
3 D 32 4A KEY10  TCY      5
3 D 25 61 KEY10A TCMIY    8
3 D 0A 2A        LDX      2
3 D 15 04        DYN
3 D 2A 69        TCMIY    9
3 D 14 8C        BR       BOUT1A
3 D 28 46 KEY11  TCY      6
3 D 10 A5        BR       KEY10A
```

We claim:

1. Thermostat means for regulating a temperature conditioning system having independently operable main and auxiliary temperature conditioning means comprising means for sensing the temperature in a zone whose temperature is to be conditioned, means for scheduling temperatures to be provided in the zone during respective periods of time in a selected time sequence, and control means responsive both to the temperature sensing and scheduling means for operating the main temperature conditioning means when required in any of said time periods either to maintain a scheduled temperature in a period or to initiate conditioning of the zone temperature to provide the zone temperature scheduled to be provided in a next scheduled time period, said control means being responsive to the temperature sensing and scheduling means for comparing the zone temperature being provided in a time period with a temperature scheduled to be provided in that period, for comparing the zone temperature in any of said time periods with the temperature scheduled to be provided in the zone in the next scheduled time period in said time sequence to determine a time period when any operation of the main temperature conditioning means is required to be initiated for conditioning the zone temperature at a predetermined and desired rate of change of zone temperature to provide said next scheduled zone temperature at the start of said next time period, and to operate the main temperature conditioning means when required to maintain said scheduled zone temperature or at said determined time to initiate conditioning of the zone temperature to provide said next scheduled temperature, said control means being further responsive to the temperature sensing means for determining the actual rate of change of temperature then effected in the zone by the temperature conditioning means of the system during any operating thereof and for operating the auxiliary temperature conditioning means to aid the main temperature conditioning means in conditioning zone temperature only when said actual rate of change of zone temperature is less than said predetermined and desired rate of change of zone temperature.

2. An electronic thermostat for regulating independently operable main and auxiliary temperature conditioning means comprising:

(a) switch means actuable for selectively operating the main and auxiliary temperature conditioning means;

(b) means for sensing the temperature in a zone whose temperature is to be conditioned and for providing a signal indicative thereof;

(c) means for generating time signals;

(d) means for storing data selectively entered therein;

(e) data entry means for entering data into the storage means representative of selected temperatures scheduled to be provided in the zone during selected periods of time in a selected time sequence; and (f) logic circuitry coupled to the data storage means and responsive to the temperature sensing and time signal generating means for actuating the switch means to operate the main temperature conditioning means when required in any of said time periods to initiate conditioning of the zone temperature to provide the zone temperature scheduled to be provided in that time period, said logic circuitry being adopted to compare the zone temperature in each of said time periods with the temperature to be provided in the zone in the next scheduled time period in said time sequence to determine a time prior to the start of said next scheduled time period when any operation of the main temperature conditioning means is required to be initiated for conditioning the zone temperature at a predetermined and desired rate of change in zone temperature to provide said next scheduled zone temperature at the start of said next time period and to actuate the switch means to operate the main temperature conditioning means at said determined time to initiate conditioning of the zone temperature to provide said next scheduled temperature, said logic circuitry being further responsive to the temperature sensing means to determine the actual rate of change of zone temperature then effected by the temperature conditioning means during any operation thereof and to actuate the switch means to operate the auxiliary temperature conditioning means to aid the main temperature conditioning means in conditioning zone temperature only when said actual rate of change of zone temperature is less than said predetermined and desired rate of change of zone temperature.

3. A programmable electronic digital thermostat for regulating independently operable main auxiliary temperature conditioning means comprising;

(a) switch means actuable for selectively operating the main and auxiliary temperature conditioning means;

(b) means for sensing the temperature in a zone whose temperature is to be conditioned and for providing a digital signal indicative of said temperature;

(c) means for generating time signals;

(d) first memory means for storing digital coded information into the first memory means representative of selected temperature scheduled to be provided in the zone during selected periods of time in a selected time sequence; and (f) digital processor means having digital coded information constituting an instruction sequence permanently stored therein, said processor means being coupled to the first memory means and being adopted to respond to said time and temperature signals in accordance with said instruction sequence for actuating the switch means to operate the main temperature conditioning means when required in any of said time periods to initiate conditioning of the zone temperature to provide the zone temperature scheduled to be provided in that time period, said processor means having a predetermined and desired rate of change of zone temperature established as a constant and being adopted to determine the actual rate of change of zone temperature being effected by the temperature conditioning means during any operation thereof and to actuate the switch means to operate the auxiliary temperature conditioning means to aid the main temperature conditioning means in conditioning zone temperature at said selected constant selected rate to provide said scheduled temperature when said actual rate of change of zone temperature is less than said selected constant rate of change of zone temperature, said digital processor means comparing zone temperature in each of said time periods with the temperature to be provided in the zone in the next scheduled time period in said time sequence in accordance with said permanently stored instruction sequence to determine a time prior to the start of said next scheduled time period when any operation of the main temperature conditioning means is required to be initiated for conditioning the zone temperature at said predetermined and desired rate of change of zone temperature to provide said next scheduled zone temperature at the start of said next time period and to actuate said switch means to operate the main temperature conditioning means at said determined time.

4. A temperature conditioning system comprising main temperature conditioning means operable for conditioning the temperature in a zone, auxiliary temperature conditioning means operable to aid the main temperature conditioning means for conditioning the zone temperature, means for sensing temperature in the zone, means for scheduling temperatures to be provided in the zone during respective periods of time in a selected time sequence, and control means responsive to the temperature sensing and scheduling means for operating the main temperature conditioning means when required in any of said time periods to initiate conditioning of the zone temperature to provide the zone temperature scheduled to be provided in that time period, said control means being responsive to the temperature sensing and scheduling means for comparing the zone temperature in any of said time periods with the temperature scheduled to be provided in the zone in the next scheduled time period in said time sequence to determine a time prior to the start of said next scheduled time period when any operation of the main temperature conditioning means is required to be initiated for conditioning the zone temperature at a predetermined and desired rate of change of zone temperature to provide said next scheduled zone temperature at the start of said next time period and to operate the main temperature conditioning means at said determined time to initiate conditioning of the zone temperature to provide said next scheduled temperature, said control means being further responsive to the temperature sensing means for determining the actual rate of change of temperature then effected in the zone by the temperature conditioning means of the system during any operation thereof and for operating the auxiliary temperature conditioning means to aid the main temperature conditioning means in conditioning zone temperature only when said actual rate of change of zone temperature is less than said predetermined and desired rate of change of zone temperature.

5. A temperature conditioning system comprising main temperature conditioning means operable for conditioning the temperature in a zone, auxiliary temperature conditioning means operable to aid the main temperature conditioning means for conditioning the zone temperature, and a programmable electronic digital thermostat comprising;
   (a) switch means actuable for selectively operating the main and auxiliary temperature conditioning means;
   (b) means for sensing the temperature in a zone whose temperature is to be conditioned and for providing a ditial signal indicative of said temperature;
   (c) means for generating time signals;
   (d) first memory means for storing digital coded information selectively entered therein;
   (e) data entry means for entering digital coded information into the first memory means representative of selected temperatures scheduled to be provided in the zone during selected periods of time in a selected time sequence; and
   (f) digital processor means having digital coded information constituting an instruction sequence permanently stored therein, said processor means being coupled to the first memory means and being adopted to respond to said time and temperature signals in accordance with said instruction sequence for actuating the switch means to operate the main temperature conditioning means when required in any of said time periods to initiate conditioning of the zone temperature to provide the zone temperature scheduled to be provided in that time period, predetermined and desired rate of change of zone temperature established as a constant and being adopted to determine the actual rate of change of zone temperature being effected by the temperature conditioning means during any operation thereof and to actuate the switch means to operate the auxiliary temperature conditioning means to aid the main temperature conditioning means in conditioning zone temperature at said predetermined and desired constant rate to provide said scheduled temperature when said actual rate of change of zone temperature is less than said predetermined and desired rate of change of zone temperature, said digital processor means comparing zone temperature in each of said time periods with the temperature to be provided in the zone in the next scheduled time period in said time sequence in accordance with said permanently stored instruction sequence to determine a time prior to the start of said next scheduled time period when any operation of the main temperature conditioning means is required to be initiated for conditioning the zone temperature at said predetermined and desired rate of change of zone temperature to provide said next scheduled zone temperature at the start of said next time period and to actuate said switch means to operate the main temperature conditioning means at said determined time.

6. A temperature conditioning system as set forth in claim 5 wherein said main temperature conditioning means comprises heat pump means having relatively higher energy efficiency than said auxiliary temperature conditioning means.

7. A temperature conditioning system as set forth in claim 6 wherein said auxiliary temperature conditioning means comprises electrical resistance heater means.

8. A method for regulating operation of a temperature conditioning system having independently operable main and auxiliary temperature conditioning means comprising the steps of scheduling temperatures to be maintained in a zone during respective periods of time in a selected time sequence, continously sensing the zone temperature, comparing zone temperature sensed in each time period to the temperature scheduled to be provided in that period and operating the main temperature conditioning means when required to initiate conditioning of zone temperature to provide said scheduled temperature comparing the zone temperature sensed in each of said time periods with the temperature scheduled to be provided in the zone in the next scheduled time period in said time sequence and determining a time prior to the start of said next scheduled time period when any operation of the main temperature conditioning means is required to be initiated for conditioning the zone temperature at a predetermined and desired rate of change of zone temperature to provide said next scheduled temperature at the start of said next time period, initiating operation of the main temperature conditioning means at any such determined time to initiate conditioning of the zone temperature to provide said next scheduled temperature, and determining the actual rate of change of zone temperature being effected by the temperature conditioning means during any operation thereof and operating the auxiliary temperature conditioning means to aid the main temperature conditioning means in conditioning zone temperature when said actual rate of change of zone temperature is less than said predetermined and desired rate of change of zone temperature.

* * * * *